(12) United States Patent
Takano

(10) Patent No.: US 10,587,326 B2
(45) Date of Patent: Mar. 10, 2020

(54) DEVICE FOR CALCULATING A RECEIVED QUALITY OF REFERENCE SIGNAL

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 109 days.

(21) Appl. No.: 15/307,866

(22) PCT Filed: Apr. 21, 2015

(86) PCT No.: PCT/JP2015/062146
§ 371 (c)(1),
(2) Date: Oct. 31, 2016

(87) PCT Pub. No.: WO2015/182292
PCT Pub. Date: Dec. 3, 2015

(65) Prior Publication Data
US 2017/0117948 A1    Apr. 27, 2017

(30) Foreign Application Priority Data
May 29, 2014 (JP) ................................ 2014-111655

(51) Int. Cl.
*H04B 7/06* (2006.01)
*H04B 7/10* (2017.01)
(Continued)

(52) U.S. Cl.
CPC ......... *H04B 7/0632* (2013.01); *H04B 7/0413* (2013.01); *H04B 7/0617* (2013.01);
(Continued)

(58) Field of Classification Search
CPC .. H04B 7/0632; H04B 7/0413; H04B 7/0617; H04B 7/06
See application file for complete search history.

(56) References Cited

U.S. PATENT DOCUMENTS

| 2003/0003937 A1* | 1/2003 | Ohkubo | ............... H04B 7/0608 455/517 |
| 2010/0130171 A1 | 5/2010 | Palanigounder et al. | |

(Continued)

FOREIGN PATENT DOCUMENTS

| JP | 2011-004056 A | 1/2011 |
| JP | 2012-510241 A | 4/2012 |

(Continued)

OTHER PUBLICATIONS

International Search Report dated Jun. 9, 2015 in PCT/JP2015/062146 filed Apr. 21, 2015.

*Primary Examiner* — Anez C Ebrahim
(74) *Attorney, Agent, or Firm* — Xsensus, LLP

(57) ABSTRACT

[Object] To make it possible to select a cell that is more preferable for a terminal device in an environment in which beamforming is performed.
[Solution] There is provided a device including: an acquiring unit configured to acquire first received power information indicating received power of a reference signal for measurement transmitted by a target base station using a weight set for beamforming in a terminal device and second received power information indicating received power of a reference signal for measurement transmitted by another base station using a weight set for beamforming in the terminal device; and a control unit configured to calculate received quality of the reference signal transmitted by the target base station in the terminal device based on the first received power information and the second received power information.

20 Claims, 23 Drawing Sheets

(51) Int. Cl.
*H04W 16/28* (2009.01)
*H04B 17/336* (2015.01)
*H04B 7/0413* (2017.01)

(52) U.S. Cl.
CPC ............ *H04B 7/10* (2013.01); *H04B 17/336* (2015.01); *H04W 16/28* (2013.01)

(56) References Cited

U.S. PATENT DOCUMENTS

| | | | |
|---|---|---|---|
| 2011/0228835 A1* | 9/2011 | Sakai | H04B 7/0417 375/227 |
| 2011/0286346 A1 | 11/2011 | Barbieri et al. | |
| 2014/0073329 A1* | 3/2014 | Kang | H04W 36/30 455/439 |
| 2014/0211731 A1 | 7/2014 | Inoue et al. | |
| 2015/0016379 A1* | 1/2015 | Nam | H04B 7/0456 370/329 |

FOREIGN PATENT DOCUMENTS

| | | |
|---|---|---|
| JP | 2013-524736 A | 6/2013 |
| WO | 2011/040609 A1 | 4/2011 |
| WO | 2013/024852 A1 | 2/2013 |

\* cited by examiner

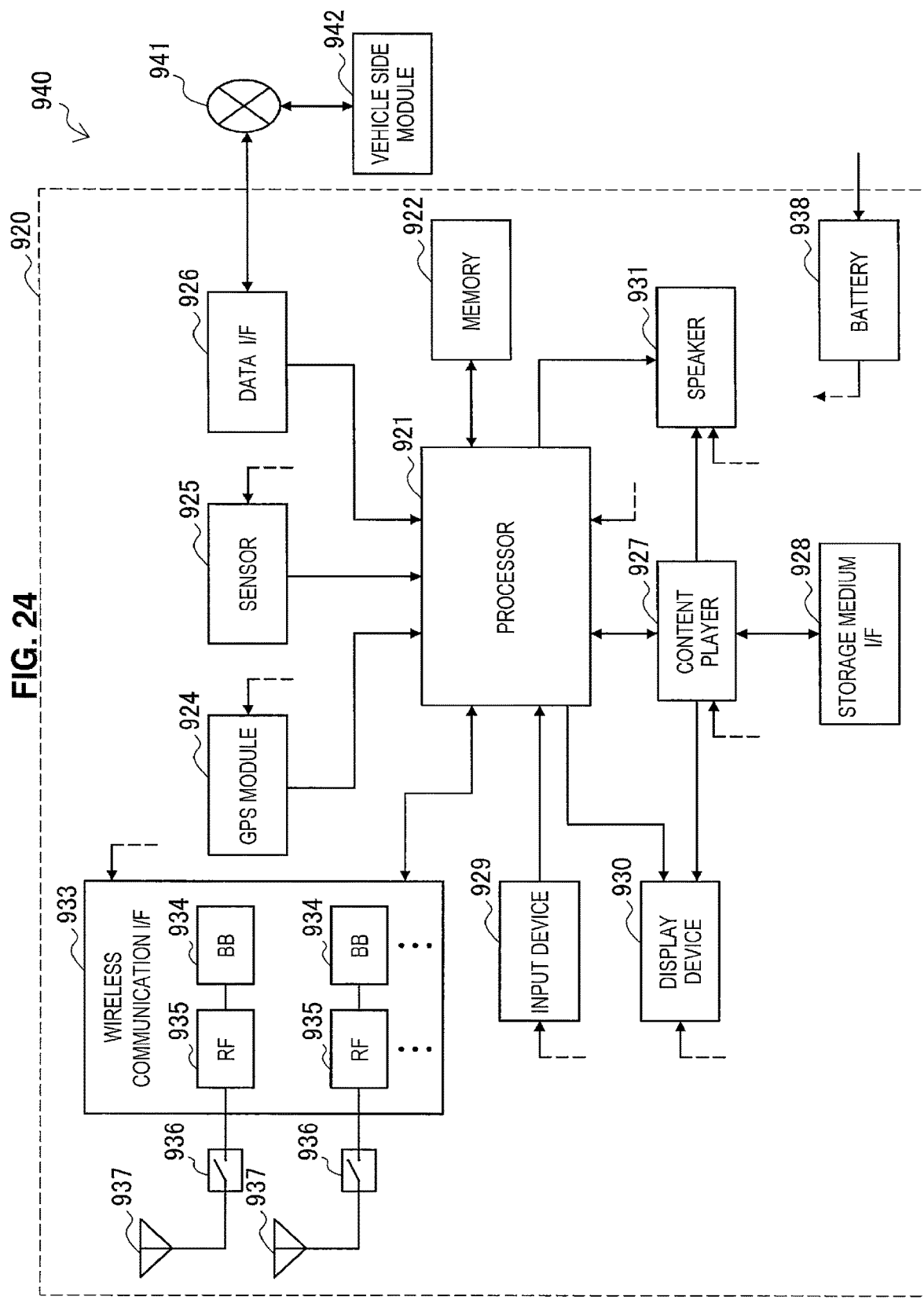

DEVICE FOR CALCULATING A RECEIVED QUALITY OF REFERENCE SIGNAL

TECHNICAL FIELD

The present disclosure relates to a device.

BACKGROUND ART

Currently, in the Third Generation Partnership Project (3GPP), in order to accommodate explosively increasing traffic, various technologies for increasing the capacity of cellular systems are being investigated. In the future, it is predicted that a capacity of about 1000 times the current capacity will be necessary. Technologies such as multi-user multiple-input multiple-output (MU-MIMO) and coordinated multipoint (CoMP) are considered to increase the capacity of cellular systems to only about several times the previous capacity. Therefore, a breakthrough technique is necessary.

For example, as a technique for significantly increasing the capacity of cellular systems, a base station that uses a directional antenna including multiple antenna elements (for example, about 100 antenna elements) and performs beamforming is considered. Such technology is a form of technology called large-scale MIMO or massive MIMO. According to such beamforming, a half width of a beam is narrowed. That is, a sharp beam is formed. In addition, when the multiple antenna elements are arranged on a plane, it is also possible to form a beam in a desired three-dimensional direction.

Various beamforming technologies are proposed. For example, in Patent Literature 1, technology for implementing beamforming by a base station even when frequency bands of an upstream channel and a downstream channel are different is disclosed.

CITATION LIST

Patent Literature

Patent Literature 1 JP 2011-004056A

SUMMARY OF INVENTION

Technical Problem

However, when beamforming is performed, received quality of a reference signal (for example, reference signal received quality (RSRQ)) may be significantly varied. For example, interference from another base station may be significantly varied according to which weight set is used for the other base station to perform beamforming. Therefore, for example, a received signal strength indicator (RSSI) significantly varies and RSRQ also significantly varies. Specifically, when the beamforming is large-scale MIMO or massive MIMO beamforming, there is a possibility of RSRQ being significantly greatly varied. As a result, for example, a cell that is not preferable as a cell in which a terminal device performs wireless communication (for example, a target cell of a handover) may be selected.

Therefore, it is preferable to provide a mechanism through which it is possible to select a cell that is more preferable for a terminal device in an environment in which beamforming is performed.

Solution to Problem

According to the present disclosure, there is provided a device including: an acquiring unit configured to acquire first received power information indicating received power of a reference signal for measurement transmitted by a target base station using a weight set for beamforming in a terminal device and second received power information indicating received power of a reference signal for measurement transmitted by another base station using a weight set for beamforming in the terminal device; and a control unit configured to calculate received quality of the reference signal transmitted by the target base station in the terminal device based on the first received power information and the second received power information.

According to the present disclosure, there is provided a device including: an acquiring unit configured to acquire first received power information indicating received power of a reference signal for measurement transmitted by a target base station using a weight set for beamforming in a terminal device and second received power information indicating received power of a signal transmitted within a symbol in which physical downlink control channels are arranged in the terminal device; and a control unit configured to calculate received quality of the reference signal transmitted by the target base station in the terminal device using the first received power information and the second received power information.

According to the present disclosure, there is provided a device including: an acquiring unit configured to acquire received power information indicating received power of a reference signal for measurement transmitted by a base station using a weight set for beamforming in a terminal device; and a control unit configured to provide the received power information to a base station.

Advantageous Effects of Invention

According to the present disclosure described above, it is possible to select a cell that is more preferable for a terminal device in an environment in which beamforming is performed. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 24 is a block diagram illustrating an example of a schematic configuration of a car navigation apparatus.

DESCRIPTION OF EMBODIMENT(S)

Figure 1:
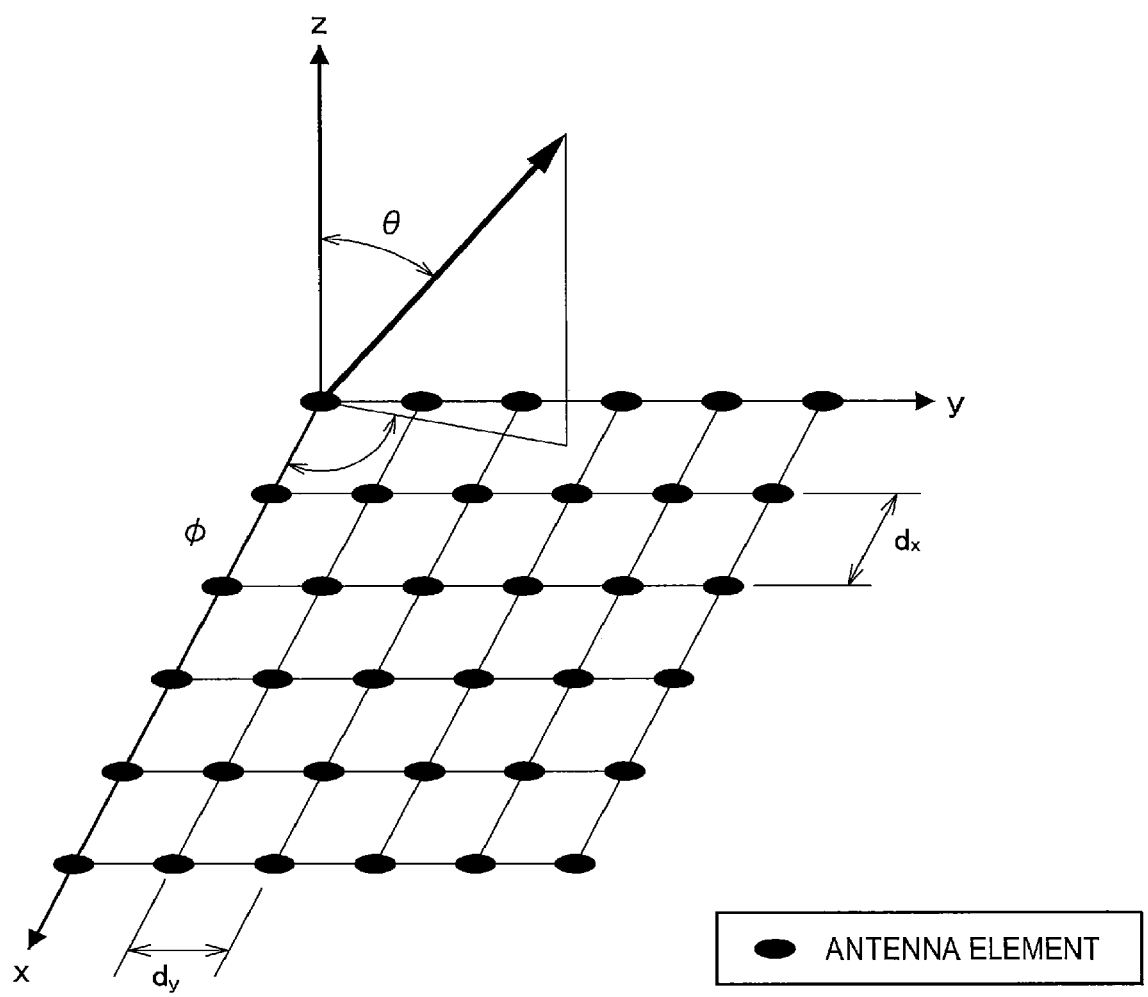
FIG. 1 is an explanatory diagram for describing a weight set for large-scale MIMO beamforming.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

In this specification and the drawings, there are cases in which components having substantially the same functional configuration are distinguished by adding different alphabets to the end of the same reference numeral. For example, a plurality of components having substantially the same functional configuration are distinguished like terminal devices 100A, 100B, and 100C as necessary. However, when a plurality of components having substantially the same functional configuration need not be particularly distinguished, only the same reference numeral is added. For example, when the terminal devices 100A, 100B, and 100C need not be particularly distinguished, they are referred to simply as a "terminal devices 100."

The description will proceed in the following order.
1. Introduction
2. Schematic configuration of communication system
3. Transmission of reference signal
4. Common points and different points of first to fourth embodiments
5. First Embodiment
   5.1. Configuration of terminal device
   5.2. Method of calculating received quality
   5.3. Process flow
6. Second Embodiment
   6.1. Configuration of terminal device
   6.2. Configuration of base station
   6.3. Method of calculating received quality
   6.4. Process flow
7. Third Embodiment
   7.1. Configuration of terminal device
   7.2. Method of calculating received quality
   7.3. Process flow
8. Fourth Embodiment
   8.1. Configuration of terminal device
   8.2. Configuration of base station
   8.3. Method of calculating received quality
   8.4. Process flow
9. Application examples
   9.1. Application examples for base station
   9.2. Application examples for terminal device
10. Conclusion

1. INTRODUCTION

First, beamforming, measurement and cell selection will be described with reference to FIG. 1 and FIG. 2.

(Beamforming)

(a) Necessity of Large-Scale MIMO

Currently, in the 3GPP, in order to accommodate explosively increasing traffic, various technologies for increasing the capacity of cellular systems are being investigated. In the future, it is predicted that a capacity of about 1000 times the current capacity will be necessary. Technologies such as MU-MIMO and CoMP are considered to increase the capacity of cellular systems to only about several times the previous capacity. Therefore, a breakthrough technique is necessary.

In 3GPP release 10, an eNodeB in which eight antennas are implemented is standardized. According to the antennas, eight-layer MIMO can be implemented in single-user multiple-input multiple-output (SU-MIMO). 8-layer MIMO is technology in which eight independent streams are spatially multiplexed. In addition, it is possible to implement two-layer MU-MIMO with four users.

In user equipment (UE), it is difficult to increase the number of antenna elements of an antenna of the UE due to a small space for arranging antennas and a limited UE processing capacity. However, according to recent advances in antenna mounting technology, it is possible to arrange a directional antenna including about 100 antenna elements in an eNodeB.

For example, as a technique for significantly increasing the capacity of cellular systems, a base station that uses a directional antenna including multiple antenna elements (for example, about 100 antenna elements) and performs beamforming is considered. Such technology is a form of technology called large-scale MIMO or massive MIMO. According to such beamforming, a half width of a beam is narrowed. That is, a sharp beam is formed. In addition, when the multiple antenna elements are arranged on a plane, it is also possible to form a beam in a desired three-dimensional direction. For example, a technique is proposed in which a beam directed toward a position higher than a base station (for example, an upper floor of a high-rise building) is formed, and thus a signal is transmitted to a terminal device in such a position.

In typical beamforming, it is possible to change a direction of a beam in a horizontal direction. Therefore, the typical beam forming may be referred to as two-dimensional beamforming. On the other hand, in large-scale MIMO (or massive MIMO) beamforming, it is possible to change a direction of a beam in a vertical direction in addition to the horizontal direction. Therefore, the large-scale MIMO beamforming may be referred to as three-dimensional beamforming.

Since the number of antennas increases, it is possible to increase the number of users of MU-MIMO. Such technology is another form of technology called large-scale MIMO or massive MIMO. When the number of antennas of a UE is 2, the number of streams that are spatially independent in a single UE is 2. Therefore, increasing the number of users of MU-MIMO is more reasonable than increasing the number of streams in a single UE.

(b) Weight Set

A weight set for beamforming (that is, a set of weight coefficients for multiple antenna elements) is represented as a complex number. Hereinafter, an example of a weight set for large-scale MIMO beamforming will be described specifically with reference to FIG. 1.

FIG. 1 is an explanatory diagram for describing a weight set for large-scale MIMO beamforming. Referring to FIG. 1, antenna elements arranged in a grid pattern are shown. In addition, two orthogonal axes x and y on a plane in which antenna elements are arranged and one axis z orthogonal to the plane are shown. Here, a direction of a beam to be formed is indicated by, for example, an angle phi (a Greek letter) and an angle theta (a Greek letter). The angle phi (a Greek letter) is an angle formed by a component of an xy plane within a beam direction and the x axis. In addition, the angle theta (a Greek letter) is an angle formed by a beam direction and the z axis. In this case, for example, a weight coefficient $V_{m,n}$ of an antenna element that is arranged at an m-th point in an x axis direction and arranged at an n-th point in a y axis direction may be represented as follows.

$$V_{m,n}(\theta, \varphi, f) = \exp\left(j2\pi\frac{f}{c}\{(m-1)d_x\sin(\theta)\cos(\varphi) + (n-1)d_y\sin(\theta)\sin(\varphi)\}\right)$$ [Math. 1]

f denotes a frequency and c denotes the speed of light. j denotes an imaginary unit of a complex number. $d_x$ denotes an interval between antenna elements in the x axis direction. $d_y$ denotes an interval between antenna elements in the y axis direction. Coordinates of the antenna element are represented as follows.

$$x=(m-1)d_x, y=(n-1)d_y$$ [Math. 2]

A weight set for typical beamforming (two-dimensional beamforming) may be decomposed into a weight set for forming a beam in a desired horizontal direction and a weight set for adjusting transfer between antennas. Therefore, a weight set for large-scale MIMO beamforming may be decomposed into a first weight set for forming a beam in a desired vertical direction, a second weight set for forming a beam in a desired horizontal direction and a third weight set for adjusting transfer between antennas.

(c) Change of Environment According to Large-Scale MIMO Beamforming

When large-scale MIMO beamforming is performed, a gain reaches 10 dB or more. A change of a radio wave environment of a cellular system using the beamforming may be greater than a cellular system of the related art.

(d) Case in which Large-Scale MIMO Beamforming is Performed

For example, a base station of an urban area forming a beam directed toward a high-rise building is considered. In addition, even in a suburb, a base station of a small cell is considered to form a beam directed toward an area around the base station. A base station of a suburban macro cell is unlikely to perform large-scale MIMO beamforming.

(Measurement)

(a) CRS Measurement

In Long Term Evolution (LTE), a terminal device performs measurement of a cell-specific reference signal (CRS) transmitted by a base station. Specifically, the terminal device receives a CRS transmitted by a base station and thus performs measurement of quality of a propagation path between the base station and the terminal device. The measurement is referred to as "radio resource management (RRM) measurement," or is simply referred to as "measurement."

A result of the measurement is used to select a cell for a terminal device. As a specific example, the result of the measurement is used for cell selection/cell reselection by a terminal device that is in a radio resource control (RRC) idle (RRC Idle) state. In addition, for example, the result of the measurement is reported to a base station by a terminal device that is in an RRC connected state and is used for a handover decision by the base station.

As described above, measurement is performed by receiving a CRS. Since the CRS is a signal for measuring quality of a transmission path of omnidirectional radio waves, it is transmitted without beamforming. That is, the CRS is transmitted without multiplying the weight set for beamforming.

There is a reference signal for demodulation called a demodulation reference signal (DM-RS) or a UE-specific reference signal. Since the reference signal for demodulation is multiplied by the weight set for beamforming, it is not preferable to measure quality of a transmission path of omnidirectional radio waves. In addition, there is a reference signal called a channel state information reference signal (CSI-RS). Similarly to the CRS, the CSI-RS is transmitted without beamforming. However, since a transmission frequency of the CST-RS is low, measurement by receiving the CSI-RS consumes much time. Hereinafter, a relation between multiplication of a weight coefficient and insertion (or mapping) of a reference signal will be described with reference to FIG. 2.

Figure 2:
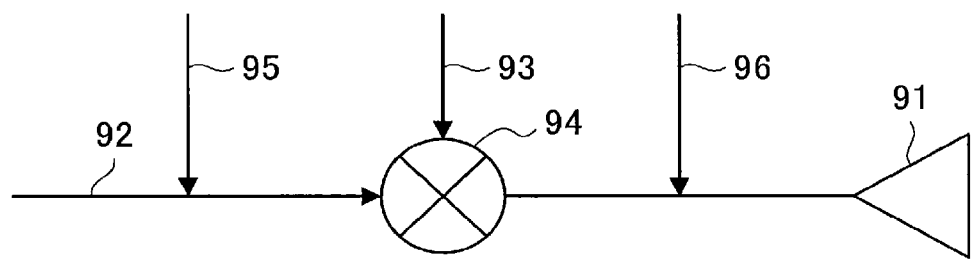
FIG. 2 is an explanatory diagram for describing a relation between multiplication of a weight coefficient and insertion of a reference signal.

FIG. 2 is an explanatory diagram for describing a relation between multiplication of a weight coefficient and insertion of a reference signal. Referring to FIG. 2, a transmission signal 92 corresponding to each antenna element 91 is complex-multiplied by a weight coefficient 93 in a multiplier 94. Then, the transmission signal 92 complex-multiplied by the weight coefficient 93 is transmitted from the antenna element 91. In addition, a DR-MS 95 is inserted before the multiplier 94, and the weight coefficient 93 is complex-multiplied in the multiplier 94. Then, the DR-MS 95 complex-multiplied by the weight coefficient 93 is transmitted from the antenna element 91. On the other hand, a CRS 96

(and CSI-RS) is inserted after the multiplier 94. Then, the CRS 96 (and CSI-RS) is transmitted from the antenna element 91 without being multiplied by the weight coefficient 93.

(b) RSRP and RSRQ

In LTE, CRS measurement is measurement of reference signal received power (RSRP) and/or reference signal received quality (RSRQ). In other words, a terminal device acquires RSRP and/or RSRQ as a result of the measurement of the CRS. The RSRQ is calculated from the RSRP and a received signal strength indicator (RSSI).

The RSRP is received power of a CRS for each single resource element. That is, the RSRP is an average value of received power of the CRS. The received power of the CRS is obtained by detecting a correlation between a reception signal in a resource element of the CRS and a known signal CRS. The RSRP corresponds to a desired signal "Signal (S)."

The RSSI is total power of signals for each Orthogonal Frequency Division Multiple Access (OFDMA) symbol. Therefore, the RSSI includes a desired signal, an interference signal and noise. That is, the RSSI corresponds to "Signal (S)+Interference (I)+Noise (N)."

The RSRQ is RSRP/(RSSI/N). N denotes the number of resource blocks used for calculating an RSSI. The resource blocks are resource blocks that are arranged in a frequency direction. Therefore, the RSRQ is a value that is obtained by dividing the RSRP using the RSSI for each resource block. That is, the RSRQ corresponds to a signal-to-interference-plus-noise ratio (SINR).

As described above, according to the measurement of the CRS, received power (that is, RSRP) and received quality (that is, RSRQ) such as an SINR are obtained.

(c) Effect of Averaging

In order to acquire the RSRP and the RSRQ, it is necessary to receive signals for several milliseconds to several tens of milliseconds and perform averaging of received power thereof. This is because, a result is likely to be influenced by an instantaneous variation of a channel such as fading when the RSRP and the RSRQ are acquired by averaging only one slot or one subset.

A technique of averaging is implemented for each terminal device and is not specifically defined in the specification.

(Cell Selection)

(a) Example of Cell Selection

For example, when a terminal device is in an RRC idle state, cell selection/cell reselection is performed. That is, the terminal device selects a cell for performing communication (for example, a cell for receiving paging).

In addition, for example, a base station performs a handover decision. That is, the base station selects a target cell for the terminal device and decides whether a handover from a serving cell for the terminal device to the target cell is performed.

In addition, for example, the base station adds a secondary cell (Scell) of carrier aggregation. The Scell is also called a secondary component carrier (SCC).

Here, the term "cell" may refer to a communication area of the base station or a frequency band that the base station uses. In addition, the term "cell" may refer to a primary cell (Pcell) or an Scell of carrier aggregation. The Pcell is also called a primary component carrier (PCC). The Scell is also called a secondary component carrier (SCC).

(b) Cell Selection when Beamforming is Performed

As described above, in the form of the technology called large-scale MIMO or massive MIMO, the base station performs beamforming using a directional antenna including multiple antenna elements (for example, about 100 antenna elements). In this case, the base station can change a direction of a beam in not only the horizontal direction but also the vertical direction. Therefore, as an example, when the base station forms a beam directed toward a position (for example, an upper floor of a high-rise building) higher than the base station, it is possible to increase throughput at the high position. As another example, when a small base station forms a beam toward a nearby area, it is possible to reduce interference with an adjacent base station.

Here, when transmission and reception of signals according to large-scale MIMO beamforming become a main flow, there is a question of whether cell selection may be performed based on the result of measurement of the CRS.

Specifically, only quality of a transmission path of omni-directional radio waves can be understood from measurement of the CRS. However, the transmission path of omni-directional radio waves is completely different from a transmission path of a sharp beam that is formed according to large-scale MIMO beamforming. Therefore, when transmission and reception of signals according to the beamforming are assumed, there is a possibility of an appropriate cell not being selected in cell selection based on the result of measurement of the CRS.

As an example, when a terminal device transmits and receives signals in a cell selected based on the result of measurement of the CRS, there is a possibility of a great amount of interference due to a sharp beam from an adjacent base station. As another example, even if a result of measurement of a CRS of a certain cell is more favorable than a result of measurement of a CRS of another cell, there is a possibility of communication quality of the other cell being more favorable than communication quality of the certain cell when beamforming is performed.

As described above, there is a possibility of an appropriate cell for a terminal device not being selected when beamforming is performed.

(c) Case in which Measurement of a CRS is not Preferable

As described above, for example, large-scale MIMO beamforming is considered to be performed by a base station of an urban area or a base station of a small cell. Therefore, it is not preferable for such base stations to perform cell selection based on measurement of a CRS.

2. SCHEMATIC CONFIGURATION OF COMMUNICATION SYSTEM

Figure 3:
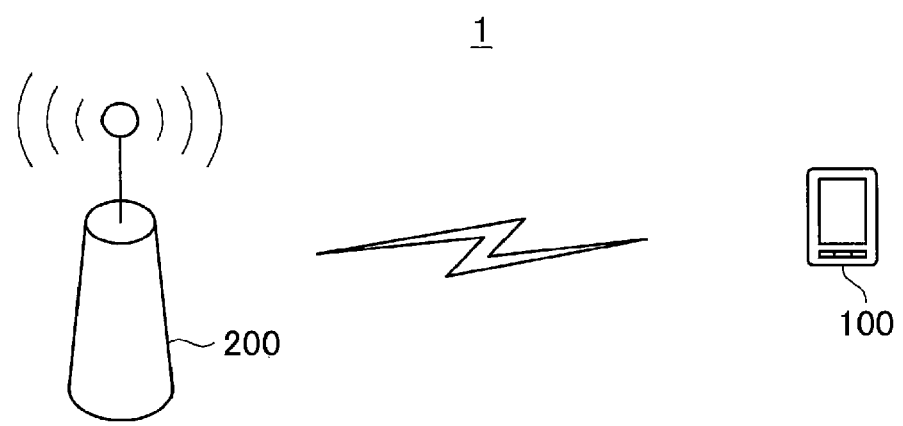
FIG. 3 is an explanatory diagram illustrating an example of a schematic configuration of a communication system according to an embodiment of the present disclosure.

Next, a schematic configuration of a communication system 1 according to an embodiment of the present disclosure will be described with reference to FIGS. 3 to 5. FIG. 3 is an explanatory diagram illustrating an example of the schematic configuration of the communication system 1 according to the embodiment of the present disclosure. Referring to FIG. 3, the communication system 1 includes a terminal device 100 and a base station 200. The communication system 1 is a system supporting, for example, LTE, LTE-Advanced, or a communication standard equivalent thereto.

(Terminal Device 100)

The terminal device 100 wirelessly communicates with a base station. For example, when the terminal device 100 is positioned within a communication area of the base station 200, the terminal device 100 wirelessly communicates with the base station 200.

(Base Station 200)

The base station 200 wirelessly communicates with a terminal device. For example, the base station 200 wirelessly communicates with a terminal device that is positioned within a communication area of the base station 200 (including, for example, the terminal device 200).

(Environment in which Beamforming is Performed)

Specifically, in embodiments of the present disclosure, beamforming is performed by a base station (for example, including the base station 200). For example, beamforming is performed by a base station that is positioned around the terminal device 100. For example, the beamforming is large-scale MIMO beamforming. The beamforming may also be referred to as massive MIMO beamforming or three-dimensional beamforming.

As a specific example, the base station (for example, the base station 200) includes a directional antenna capable of large-scale MIMO. In addition, the base station multiplies a transmission signal by a weight set for the directional antenna and thus performs large-scale MIMO beamforming. For example, the weight set is decided for each terminal device (for example, the terminal device 100). As a result, a beam directed toward the terminal device is formed. Hereinafter, an example of large-scale MIMO beamforming will be described with reference to FIG. 4 and FIG. 5.

Figure 4:
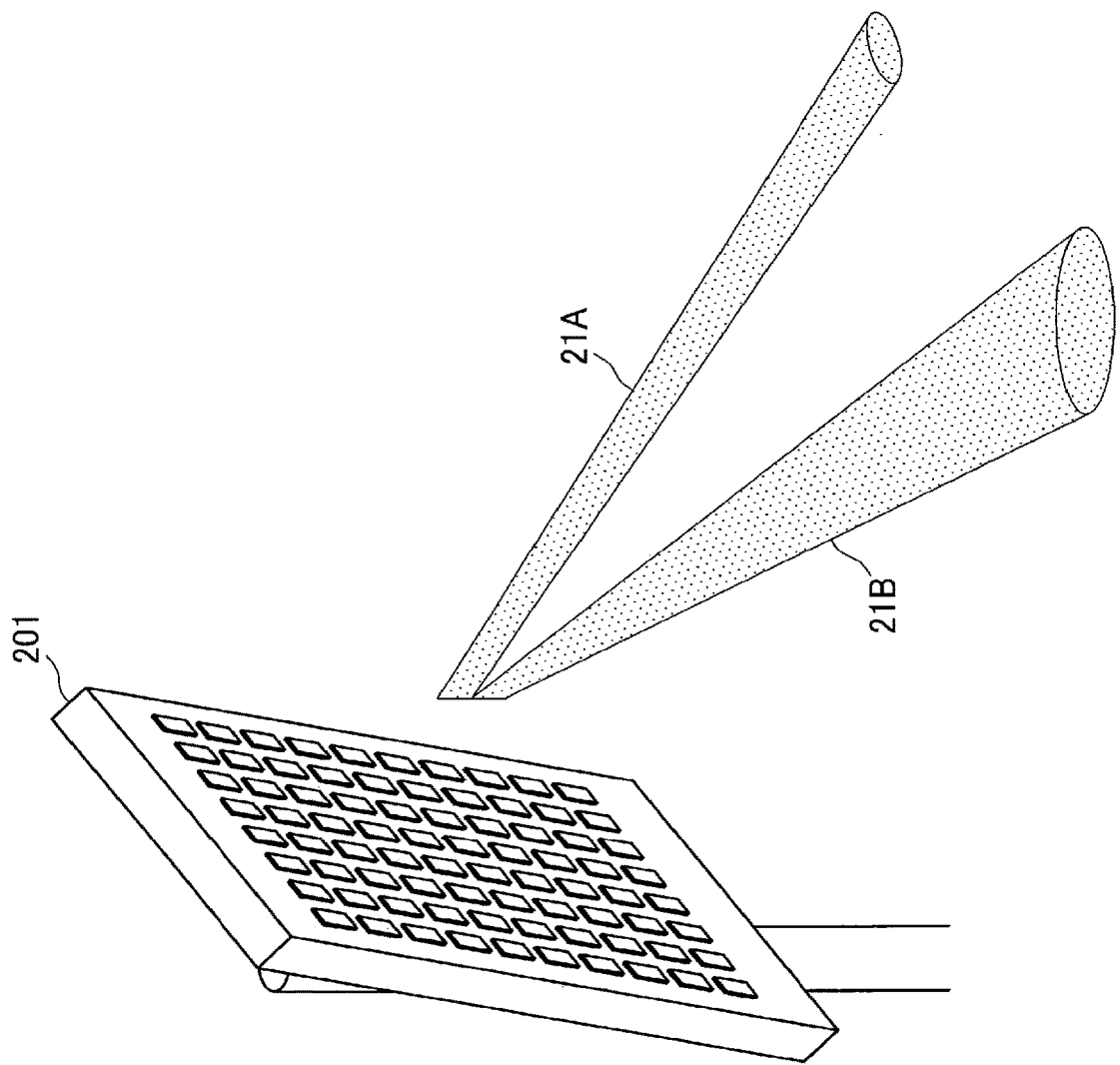
FIG. 4 is a first explanatory diagram for describing an example of large-scale MIMO beamforming.

FIG. 4 is a first explanatory diagram for describing an example of large-scale MIMO beamforming. Referring to FIG. 4, a directional antenna 201 available for large-scale MIMO is shown. The directional antenna 201 can form a sharp beam in a desired three-dimensional direction. For example, a beam 21A and a beam 21B are formed by the directional antenna 201.

Figure 5:
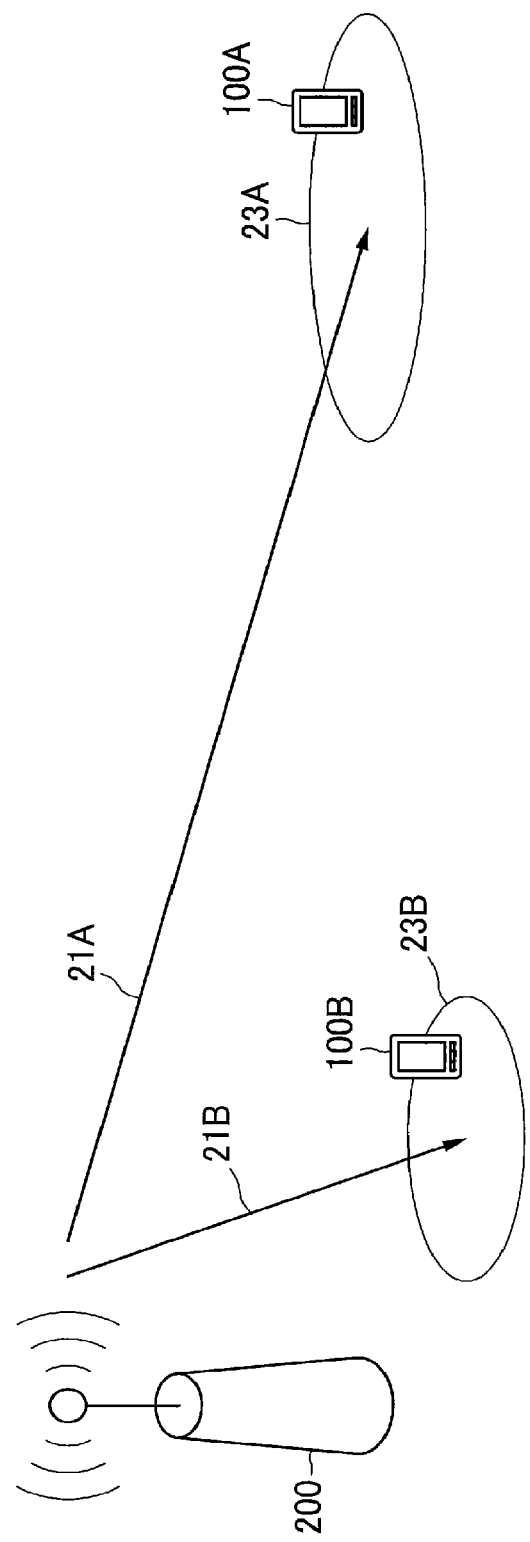
FIG. 5 is a second explanatory diagram for describing an example of large-scale MIMO beamforming.

FIG. 5 is a secondary explanatory diagram for describing an example of large-scale MIMO beamforming. Referring to FIG. 5, the beams 21A and 21B described with reference to FIG. 4 are shown. For example, the beam 21A reaches an area 23A and the beam 21B reaches an area 23B. Therefore, a terminal device 100A positioned within the area 23A can receive a signal transmitted as the beam 21A. In addition, a terminal device 100B positioned within the area 23B can receive a signal transmitted as the beam 21B. The base station 200 transmits a signal addressed to the terminal device 100A as the beam 21A and transmits a signal addressed to the terminal device 100B as the beam 21B.

The base station (for example, the base station 200) can transmit, for example, a signal without beamforming. As an example, the base station includes an omnidirectional antenna and transmits a signal as omnidirectional radio waves. As another example, the base station includes a sector antenna and may transmit a signal as a sector beam.

3. TRANSMISSION OF REFERENCE SIGNAL

Next, an example of transmission of a reference signal in an embodiment of the present disclosure will be described with reference to FIG. 6 to FIG. 10.

Specifically, in an embodiment of the present disclosure, a base station (for example, the base station 200) transmits a reference signal for measurement using a weight set for beamforming. That is, the base station multiplies the reference signal by the weight set and transmits the reference signal multiplied by the weight set. As a result, the reference signal is transmitted as a beam.

Accordingly, for example, it is possible to measure actual received power in an environment in which beamforming is performed.

(Beamforming)

For example, the beamforming is large-scale MIMO beamforming. In other words, the beamforming may also be referred to as massive MIMO beamforming or three-dimensional beamforming.

The beamforming may be an existing type of beamforming (for example, two-dimensional beamforming).

(Reference Signal for Measurement)

For example, the reference signal (that is, the reference signal for measurement) is a reference signal specific to a cell. For example, a base station transmits the reference signal in addition to the cell-specific reference signal (CRS). That is, the reference signal is a signal different from the CRS. The reference signal may include the same signal sequence as the CRS or a different signal sequence from that of the CRS.

The reference signal may be the CRS. In this case, the CRS may be multiplied by the weight set.

(Specific Example)

(a) First RS Transmission Case

In a first case (hereinafter referred to as a "first RS transmission case"), a base station uses different radio resources in order to transmit reference signals for measurement multiplied by different weight sets. Hereinafter, this will be described with reference to a specific example of FIG. 6.

Figure 6:
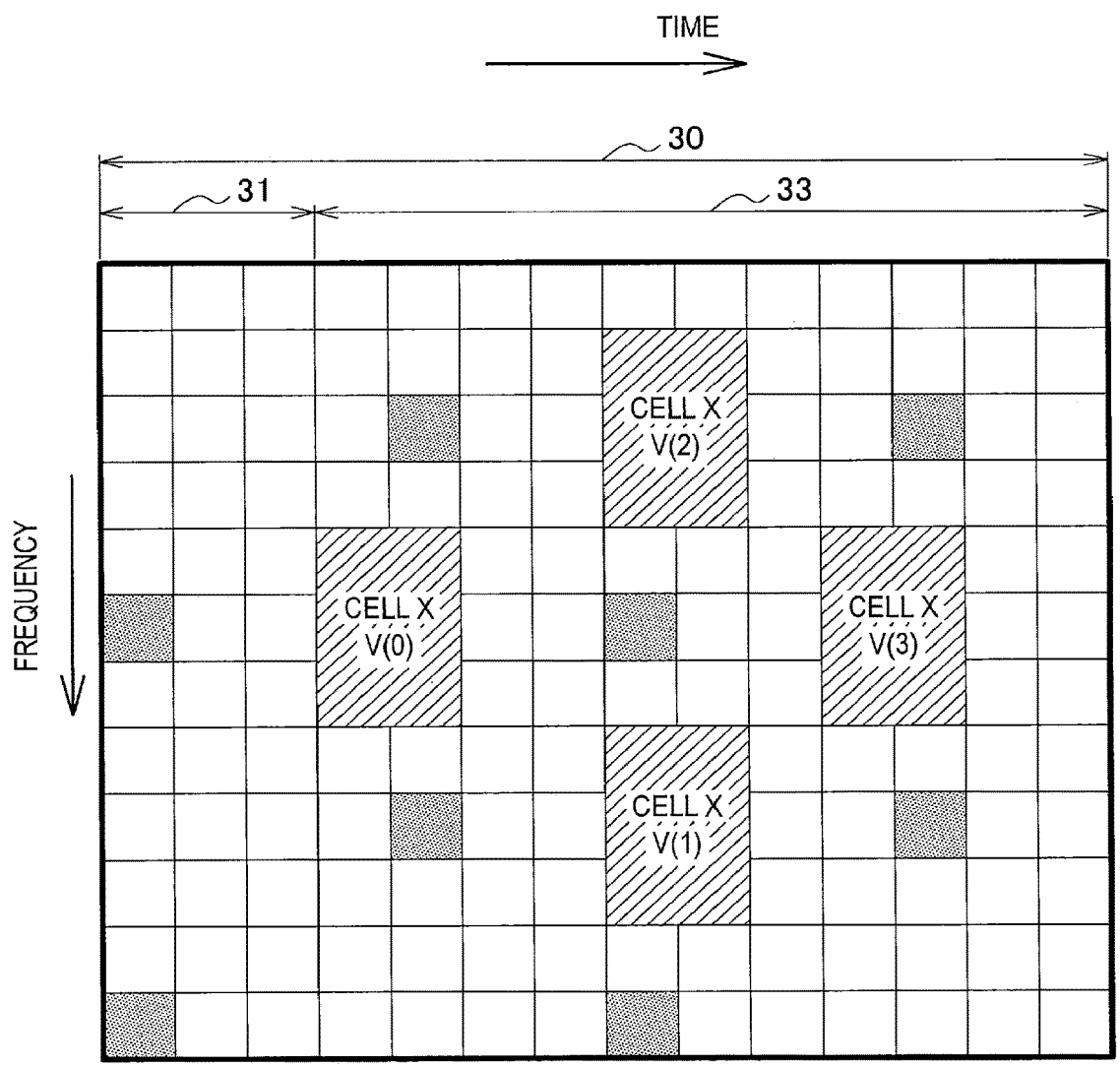
FIG. 6 is an explanatory diagram for describing a first example of transmission of reference signals for measurement multiplied by different weight sets.

FIG. 6 is an explanatory diagram for describing a first example of transmission of reference signals for measurement multiplied by different weight sets. As illustrated in FIG. 6, two resource blocks arranged in a time direction within a subframe 30 are shown. In this example, the subframe 30 includes 14 OFDMA symbols. A control area 31 of the subframe 30 includes the 1st to 3rd OFDMA symbols. A data area 33 of the subframe 30 includes the 4th to 14th OFDMA symbols. In this example, a base station of a cell X transmits a reference signal for measurement multiplied by a weight set $V(i)$ ($i=0$ to 3) using resource elements associated with the weight set $V(i)$. In this manner, in the first RS transmission case, reference signals for measurement multiplied by different weight sets are transmitted using different radio resources.

In addition, for example, different base stations (for example, different base stations that are positioned around the terminal device 100) use different radio resources in order to transmit reference signals for measurement multiplied by a weight set. Hereinafter, this will be described with reference to a specific example of FIG. 7 and FIG. 8.

Figure 7:
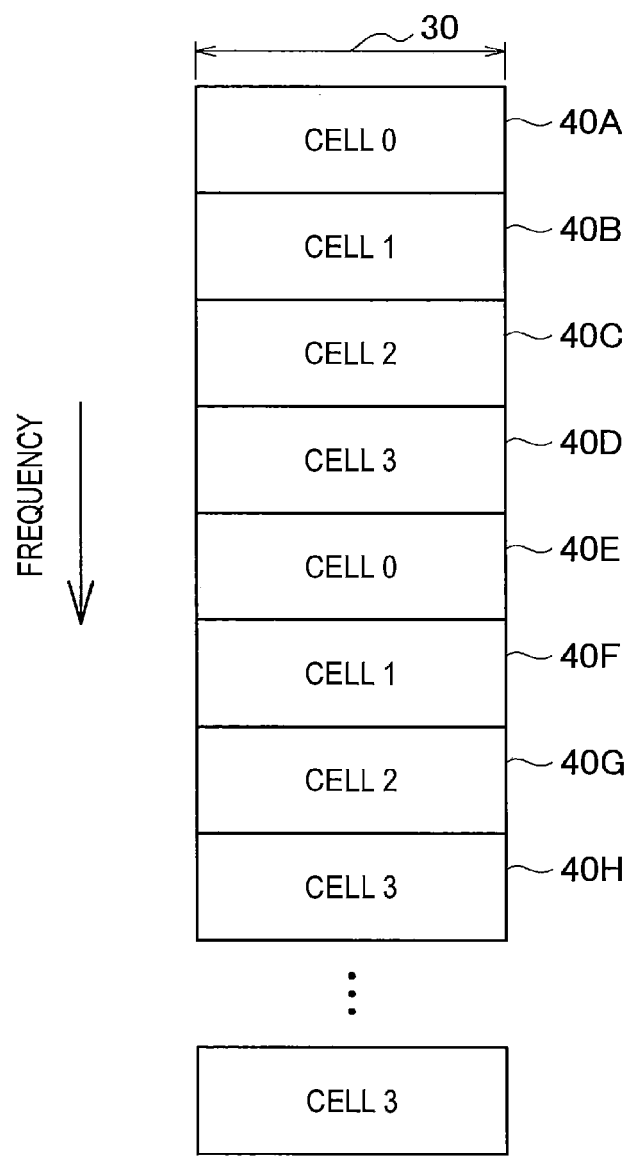
FIG. 7 is an explanatory diagram for describing a first example of transmission of reference signals for measurement by different base stations.
Figure 7:
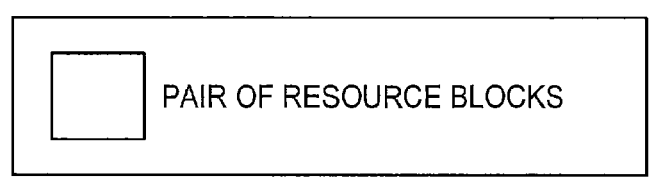

FIG. 7 is an explanatory diagram for describing a first example of transmission of reference signals for measurement by different base stations. As illustrated in FIG. 7, pairs 40 of resource blocks of the subframe 30 are shown. The pairs 40 are arranged in a frequency direction. In addition, each of the pairs 40 includes two resource blocks that are arranged in the time direction. In this example, a base station of a cell 0 transmits a reference signal for measurement multiplied by a weight set using radio resources included in pairs 40A and 40E of resource blocks. A base station of a cell 1 transmits a reference signal for measurement multiplied by a weight set using radio resources included in pairs 40B and 40F of resource blocks. A base station of a cell 2 transmits a reference signal for measurement multiplied by a weight set using radio resources included in pairs 40C and 40G of resource blocks. A base station of a cell 3 transmits a reference signal for measurement multiplied by a weight set using radio resources included in pairs 40D and 40H of resource blocks. In this manner, different base stations use different radio resources in order to transmit reference signals for measurement multiplied by a weight set.

Figure 8:
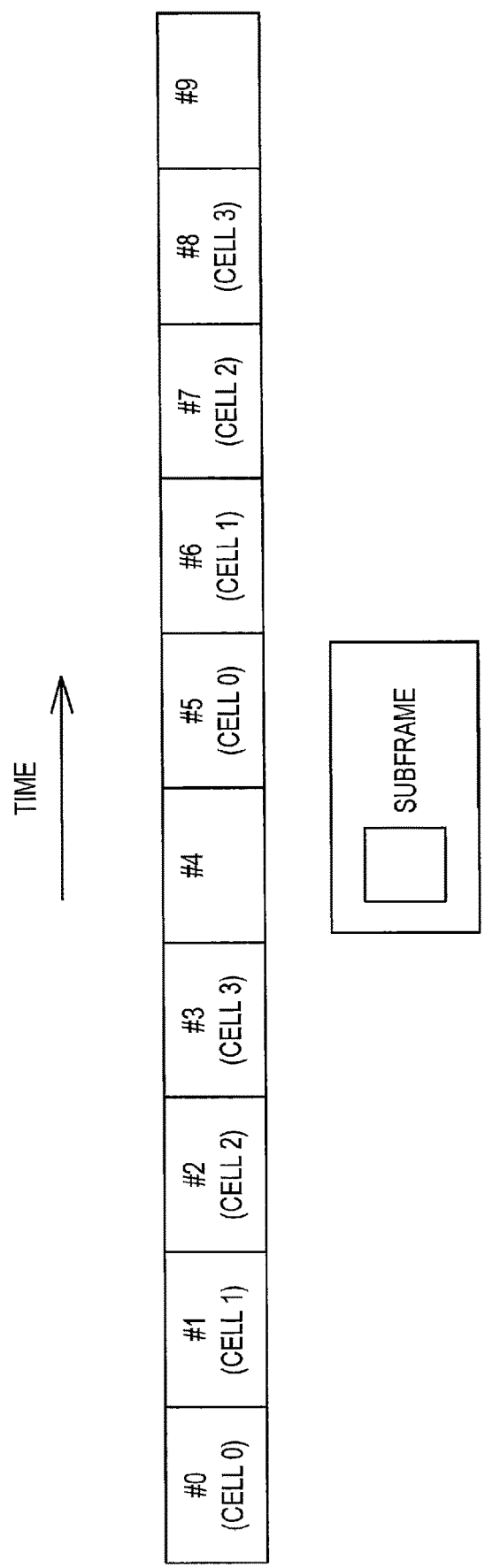
FIG. 8 is an explanatory diagram for describing a second example of transmission of reference signals for measurement by different base stations.

FIG. 8 is an explanatory diagram for describing a second example of transmission of reference signals for measurement by different base stations. As illustrated in FIG. 8, a radio frame including 10 subframes is shown. In this example, a base station of a cell 0 transmits a reference signal for measurement multiplied by a weight set using radio resources of subframes whose subframe numbers are 0 and 5. A base station of a cell 1 transmits a reference signal for measurement multiplied by a weight set using radio resources of subframes whose subframe numbers are 1 and 6. A base station of a cell 2 transmits a reference signal for measurement multiplied by a weight set using radio resources of subframes whose subframe numbers are 2 and 7. A base station of a cell 3 transmits a reference signal for measurement multiplied by a weight set using radio resources of subframes whose subframe numbers are 3 and 8. In this manner, different base stations use different radio resources in order to transmit reference signals for measurement multiplied by a weight set.

For example, as described above, in the first RS transmission case, the base station uses different radio resources in order to transmit reference signals for measurement multiplied by different weight sets. A use pattern of radio resources described with reference to FIG. 6 to FIG. 8 is only an example, and various patterns may be applied to an embodiment of the present disclosure.

(b) Second RS Transmission Case

In a second case (hereinafter referred to as a "second RS transmission case"), a base station transmits reference signals for measurement multiplied by different weight sets using the same radio resources. That is, the base station transmits reference signals for measurement multiplied by different weight sets through spatial multiplexing. Hereinafter, this will be described with reference to a specific example of FIG. 9.

Figure 9:
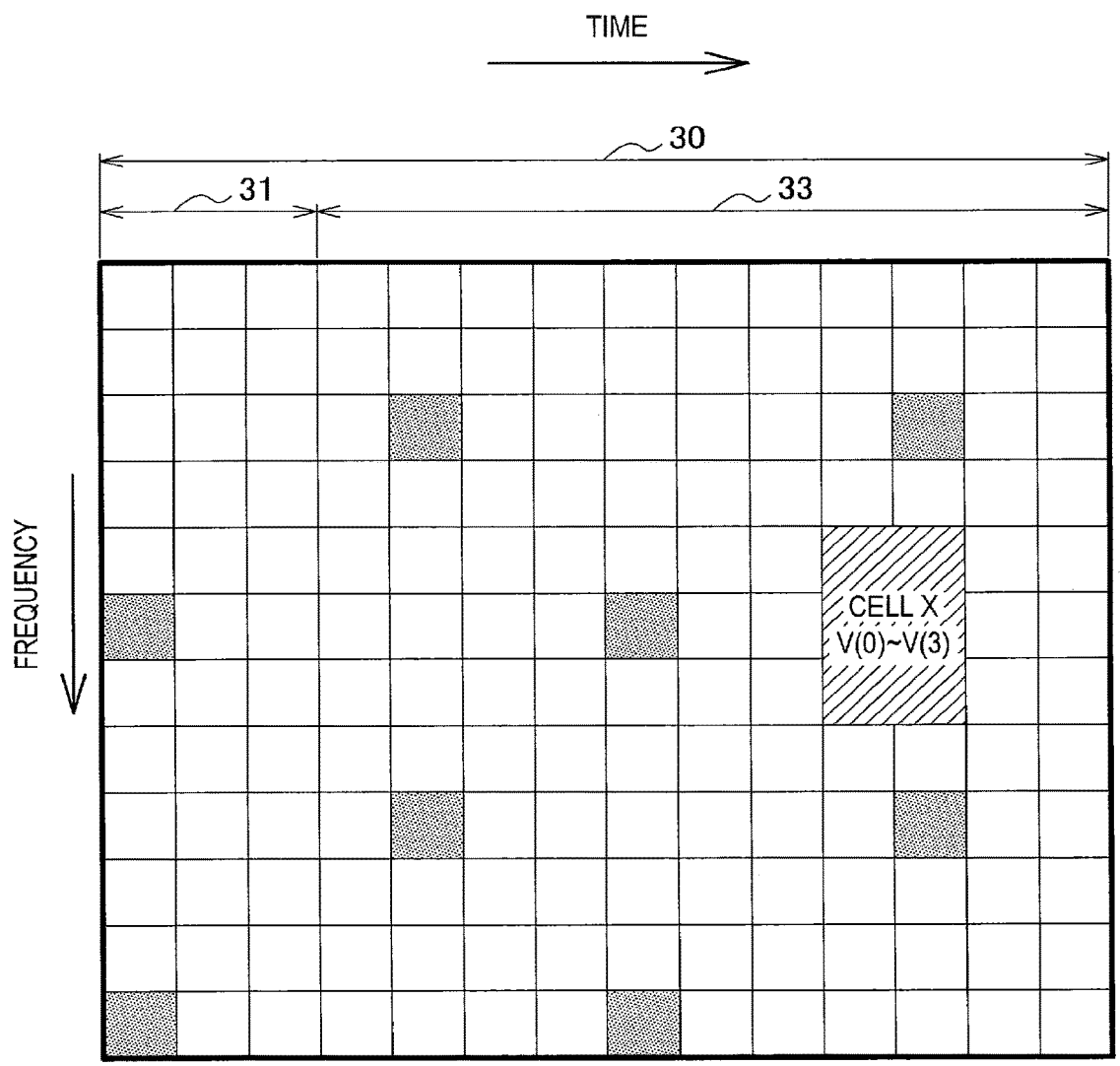
FIG. 9 is an explanatory diagram for describing a second example of transmission of reference signals for measurement multiplied by different weight sets.
Figure 9:
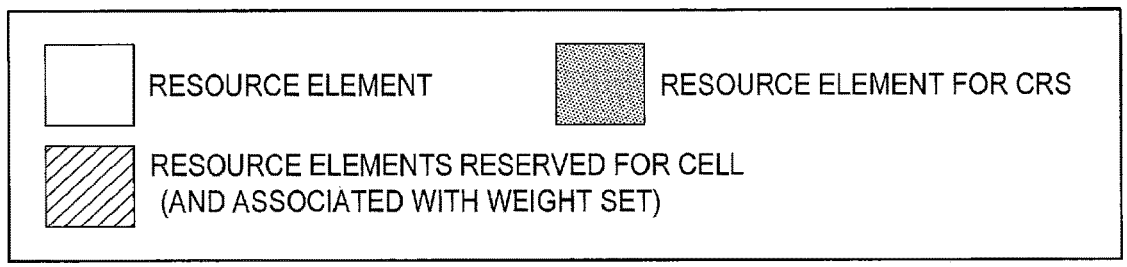

FIG. 9 is an explanatory diagram for describing a second example of transmission of reference signals for measurement multiplied by different weight sets. As illustrated in FIG. 9, similarly to FIG. 6, two resource blocks arranged in the time direction within the subframe 30 are shown. In this example, a base station of a cell X transmits a reference signal for measurement multiplied by a weight set V(i) (i=0 to 3) using resource elements common to a weight set V. In this manner, in the second RS transmission case, reference signals for measurement multiplied by different weight sets are transmitted using the same radio resources.

In addition, for example, different base stations (for example, different base stations that are positioned around the terminal device 100) use different radio resources in order to transmit reference signals for measurement multiplied by a weight set. This is the same as what is described in the first RS transmission case with reference to FIG. 7 and FIG. 8.

For example, as described above, in the second RS transmission case, the base station uses the same radio resources in order to transmit reference signals for measurement multiplied by different weight sets. A use pattern of radio resources described with reference to FIG. 7 to FIG. 9 is only an example, and various patterns may be applied to an embodiment of the present disclosure.

(Multiplication of Weight Coefficient)

A weight set is a set of weight coefficients for a plurality of antenna elements and a reference signal for measurement is multiplied by a weight coefficient corresponding to an antenna element for each of the antenna elements. Hereinafter, this will be described with reference to a specific example of FIG. 10.

Figure 10:
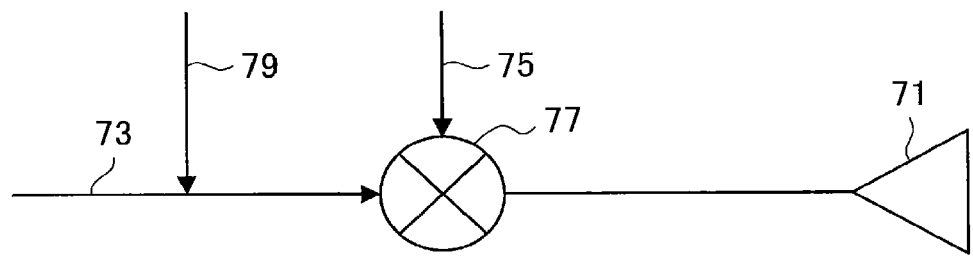
FIG. 10 is an explanatory diagram for describing multiplication of a reference signal for measurement by a weight coefficient.

FIG. 10 is an explanatory diagram for describing multiplication of a reference signal for measurement by a weight coefficient. As illustrated in FIG. 10, a transmission signal 73 corresponding to each antenna element 71 is complex-multiplied by a weight coefficient 75 in a multiplier 77. Then, the transmission signal 73 complex-multiplied by the weight coefficient 75 is transmitted from the antenna element 71. In addition, a reference signal for measurement 79 is inserted (that is, is mapped to radio resources) before the multiplier 77, and the weight coefficient 75 is complex-multiplied in the multiplier 77. Then, the reference signal for measurement 79 complex-multiplied by the weight coefficient 75 is transmitted from the antenna element 71.

4. COMMON POINTS AND DIFFERENT POINTS OF FIRST TO FOURTH EMBODIMENTS

Next, common points and different points of first to fourth embodiments of the present disclosure will be described.

(Common Points)

In the first to fourth embodiments of the present disclosure, received quality of a reference for measurement transmitted by a target base station using a weight set for beamforming in the terminal device 100 is calculated based on first received power information and second received power information. The first received power information is information indicating received power of the reference signal transmitted by the target base station using the weight set in the terminal device 100.

(Different Points)

(a) Different Points Between First and Second Embodiments and Third and Fourth Embodiments In the first embodiment and the second embodiment of the present disclosure, the second received power information is information indicating received power of a reference signal for measurement transmitted by another base station using a weight set for beamforming in the terminal device 100.

In the third embodiment and the fourth embodiment of the present disclosure, the second received power information is information indicating received power of a signal transmitted within a symbol in which physical downlink control channels are arranged in the terminal device 100.

(b) Different Points Between First Embodiment and Second Embodiment

In the first embodiment, the terminal device 100 calculates the received quality based on the first received power information and the second received power information.

In the second embodiment, the base station 200 calculates the received quality based on the first received power information and the second received power information. The terminal device 100 provides received power information indicating received power of a reference signal for measurement transmitted by a base station using a weight set for beamforming to the base station 200 in the terminal device 100.

(c) Different Points Between Third Embodiment and Fourth Embodiment

In the third embodiment, the terminal device 100 calculates the received quality based on the first received power information and the second received power information.

In the fourth embodiment, the base station 200 calculates the received quality based on the first received power information and the second received power information. The terminal device 100 provides received power information indicating received power of a reference signal for measurement transmitted by a base station using a weight set for beamforming to the base station 200 in the terminal device 100.

5. FIRST EMBODIMENT

Figure 11:
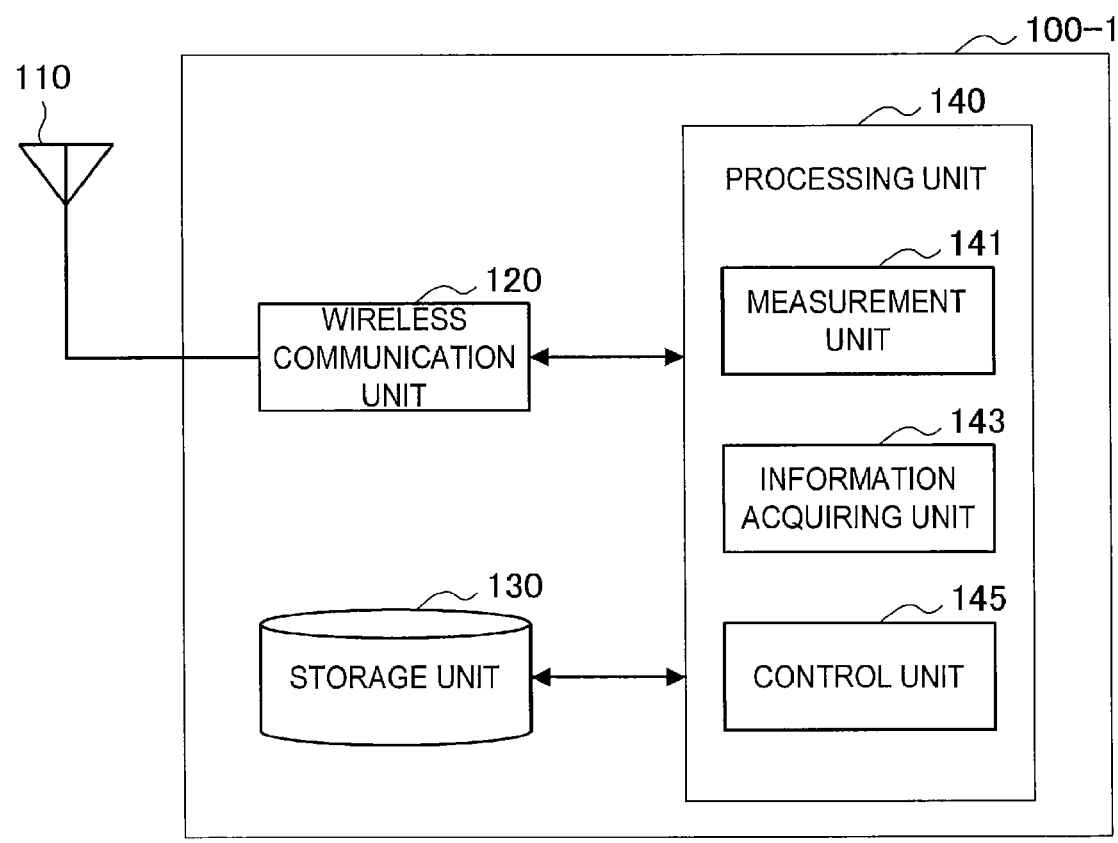
FIG. 11 is a block diagram illustrating an example of a configuration of a terminal device according to a first embodiment.
Figure 12:
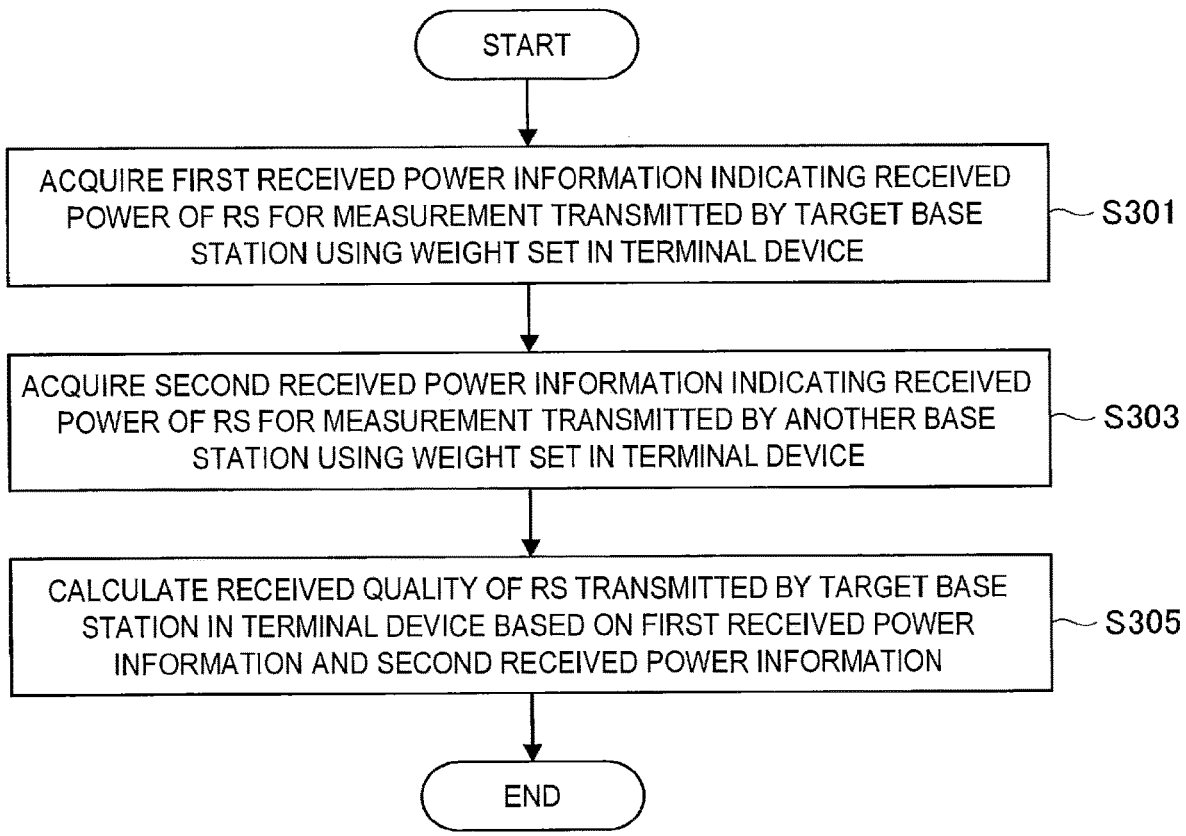
FIG. 12 is a flowchart illustrating an example of a schematic flow of a process according to the first embodiment.

Next, a first embodiment of the present disclosure will be described with reference to FIG. 11 and FIG. 12.

<5.1. Configuration of Terminal Device>

First, an example of a configuration of the terminal device 100-1 according to the first embodiment will be described with reference to FIG. 11. FIG. 11 is a block diagram illustrating an example of a configuration of the terminal device 100-1 according to the first embodiment. As illustrated in FIG. 11, the terminal device 100-1 includes an antenna unit 110, a wireless communication unit 120, a storage unit 130 and a processing unit 140.

(Antenna Unit 110)

The antenna unit 110 emits a signal output by the wireless communication unit 120 into space as radio waves. In addition, the antenna unit 110 converts spatial radio waves into a signal, and outputs the signal to the wireless communication unit 120.

(Wireless Communication Unit 120)

The wireless communication unit 120 transmits and receives signals. For example, the wireless communication unit 120 receives a downlink signal from the base station 200-1 and transmits an uplink signal to the base station 200-1.

(Storage Unit 130)

The storage unit 130 stores programs and data for operations of the terminal device 100-1.

(Processing Unit 140)

The processing unit 140 provides various functions of the terminal device 100-1. The processing unit 140 includes a measurement unit 141, an information acquiring unit 143 and a control unit 145. Alternatively, the processing unit 140 may further include a component other than these components. That is, the processing unit 140 may also perform an operation other than operations of these components.

(Measurement Unit 141)

The measurement unit 141 measures received power of a reference signal for measurement transmitted by a base station using a weight set for beamforming in the terminal device 100-1. For example, the measurement unit 141 outputs received power information indicating the received power.

(a) Measurement in RS Transmission Cases (a-1) First RS Transmission Case

As described above, in the first RS transmission case, the base station uses different radio resources in order to transmit reference signals for measurement multiplied by different weight sets.

In this case, for example, for each of two or more weight sets, the measurement unit 141 measures received power of a reference signal for measurement transmitted by a base station using a weight set in the terminal device 100-1. More specifically, for example, the measurement unit 141 measures received power of a reference signal for measurement that is transmitted using radio resources associated with a weight set in the terminal device 100-1 for each of two or more weight sets. Then, the measurement unit 141 outputs received power information of each of the two or more weight sets.

Referring again to FIG. 6, for example, the measurement unit 141 measures received power of a reference signal transmitted using a weight set V(0), received power of a reference signal transmitted using a weight set V(1), received power of a reference signal transmitted using a weight set V(2), and received power of a reference signal transmitted using a weight set V(3). Then, the measurement unit 141 outputs received power information of the weight set V(0), received power information of the weight set V(1), received power information of the weight set V(2) and received power information of the weight set V(3).

Even in the first RS transmission case, similarly to the second RS transmission case to be described, the terminal device 100-1 can measure received power. As an example, a total sum of received powers for all weight sets Vs is calculated and thus received power may be measured similarly to the second RS transmission case to be described.

(a-2) Second RS Transmission Case

As described above, in the second RS transmission case, the base station uses the same radio resources in order to transmit reference signals for measurement multiplied by different weight sets. That is, the base station transmits reference signals for measurement multiplied by different weight sets through spatial multiplexing.

In this case, for example, the measurement unit 141 measures received power of a reference signal for measurement transmitted by a base station using a weight set in the terminal device 100-1. More specifically, for example, the measurement unit 141 measures received power of a reference signal for measurement that is transmitted using radio resources common to weight sets in the terminal device 100-1. Then, the measurement unit 141 outputs received power information common to weight sets.

Referring again to FIG. 9, for example, the measurement unit 141 measures received power of a reference signal transmitted using a weight set V. That is, the measurement unit 141 measures received power of a reference signal for measurement that is transmitted using radio resources common to weight sets V(i) (i=0, 1, 2, 3) in the terminal device 100-1. Then, the measurement unit 141 outputs received power information common to the weight sets V(i).

(b) Measurement for Each Base Station

For example, for each of a plurality of base stations, the measurement unit 141 measures received power of a reference signal for measurement transmitted by a base station using a weight set in the terminal device 100-1.

More specifically, for example, for each of the plurality of base stations, the measurement unit 141 measures received power of a reference signal for measurement that is transmitted using radio resources associated with the base station in the terminal device 100-1. For example, the plurality of base stations are base stations that are positioned around the terminal device 100-1. Then, the measurement unit 141 outputs received power information for each of the plurality of base stations.

Referring again to FIG. 7 and FIG. 8, for example, the measurement unit 141 measures received power of a reference signal transmitted by the base station of the cell 0, received power of a reference signal transmitted by the base station of the cell 1, received power of a reference signal transmitted by the base station of the cell 2, and received power of a reference signal transmitted by the base station of the cell 3. Then, the measurement unit 141 outputs received power information for the base station of the cell 0, received power information for the base station of the cell 1, received power information for the base station of the cell 2, and received power information for the base station of the cell 3.

A described above, there is a case in which different radio resources are used in order to transmit reference signals for measurement multiplied by different weight sets (that is, the first RS transmission case). In this case, for example, the measurement unit 141 measures received power of a reference signal for measurement transmitted by a base station using a weight set for each of the plurality of base stations in the terminal device 100-1 for each of two or more weight sets.

Referring again to FIG. 6 to FIG. 8, for example, for the base station of the cell 0, the measurement unit 141 measures received power of a reference signal that is transmitted using the weight set V(0), received power of a reference signal that is transmitted using the weight set V(1), received power of a reference signal that is transmitted using the weight set V(2), and received power of a reference signal that is transmitted using the weight set V(3). Then, for the base station of the cell 0, the measurement unit 141 outputs received power information of the weight set V(0), received power information of the weight set V(1), received power information of the weight set V(2) and received power information of the weight set V(3). Similarly to the base station of the cell 0, the base station of the cell 1, the base station of the cell 2 and the base station of the cell 3 also measure received power of a reference signal that is transmitted using each of the weight sets V(0), V(1), V(2), and V(3) and output received power information of each of the weight sets V(0), V(1), V(2), and V(3).

(c) Learning about Radio Resources

For example, the base station 200-1 notifies the terminal device 100-1 of radio resources that are used to transmit a reference signal for measurement multiplied by a weight set. In this case, the measurement unit 141 measures received power of a reference signal for measurement that is transmitted using the radio resources of which the base station 200-1 notifies the terminal device 100-1.

As described above, the radio resources used to transmit a reference signal for measurement multiplied by a weight set may be predefined radio resources. In this case, information for specifying the radio resources may be stored in the storage unit 130. Then, the measurement unit 141 may measure received power of a reference signal for measurement that is transmitted using the radio resources (that is, the predefined radio resources) specified from the information stored in the storage unit 130.

(d) Specific Process

As described above, the measurement unit 141 measures received power of a reference signal for measurement transmitted by a base station using a weight set in the terminal device 100-1. For example, the measurement unit 141 measures received power of the reference signal for each unit resource. More specifically, for example, the measurement unit 141 measures received power of the reference signal for each resource element. That is, the measurement unit 141 performs a process of averaging received power.

Received power to be measured is not limited to the above-described example. As an example, the measurement unit 141 may measure a total sum of received powers of the reference signals.

(Information Acquiring Unit 143)

The information acquiring unit 143 acquires received power information indicating received power of a reference signal for measurement transmitted by a base station using a weight set for beamforming in the terminal device 100-1.

For example, the received power information is output by the measurement unit 141. The information acquiring unit 143 acquires the received power information.

(a) First Received Power Information

The information acquiring unit 143 acquires first received power information indicating received power of a reference signal for measurement transmitted by a target base station using a weight set for beamforming in the terminal device 100-1.

The target base station is a base station serving as a target whose received quality will be calculated. That is, the target base station is changed according to a base station whose received quality will be calculated. As an example, the processing unit 140 (for example, the control unit 145) selects the target base station from among a plurality of base stations that are positioned around the terminal device 100-1.

(b) Second Received Power Information

The information acquiring unit 143 acquires second received power information indicating received power of a reference signal for measurement transmitted by another base station using a weight set for beamforming in the terminal device 100-1. Second received power information that will be acquired by the information acquiring unit 143 will be described below in detail along with a method of calculating received quality.

The other base station is a base station that is different from a base station serving as a target whose received quality will be calculated. That is, the other base station may also be changed according to the base station whose received quality will be calculated.

When the terminal device 100-1 wirelessly communicates with the target base station, the other base station serves as an interference source of the terminal device 100-1 and the target base station. Therefore, it should be noted that the second received power information indicates interference power.

(Control Unit 145)

(a) Calculation of Received Quality

The control unit 145 calculates received quality of the reference signal transmitted by the target base station in the terminal device 100-1 based on the first received power information and the second received power information. The method of calculating received quality will be described below in detail.

(b) Provision to Base Station

For example, the control unit 145 provides the first received power information to the base station 200-1.

For example, the control unit 145 provides received quality information indicating the calculated received quality to the base station 200-1.

Specifically, for example, the control unit 145 provides the first received power information and the received quality information to the base station 200-1 periodically and/or according to a generation of a predetermined event. The control unit 145 provides the first received power information and the received quality information to the base station 200-1 through the antenna unit 110 and the wireless communication unit 120.

<5.2. Method of Calculating Received Quality>

Next, an example of the method of calculating received quality in the first embodiment will be described.

(Assumed Expression)

(a) Base Station

A base station is represented by "B." Further, a target base station is represented by "B(0)." Another base station is represented by "B(x)" (x=1, 2, 3, . . . ).

(b) Weight Set

A weight set is represented by "V" Specifically, an individual weight set is represented by "V(i)" (i=1, 2, 3, . . . ).

(c) Received Power of Reference Signal for Measurement

Received power of a reference signal for measurement in the terminal device 100-1 is represented by "RSRP."

(c-1) First RS Transmission Case

As described above, in the first RS transmission case (that is, in a case in which reference signals for measurement multiplied by different weight sets are transmitted using different radio resources), the terminal device 100-1 can measure received power for each weight set V(i). Therefore, for example, in the first RS transmission case, received power of a reference signal for measurement transmitted by the target base station B(0) using the weight set V(i) in the terminal device 100-1 is represented as follows.

$$RSRP(B(0) \text{ with } V(i)) \quad \text{[Math. 3]}$$

In addition, for example, in the first RS transmission case, received power of a reference signal for measurement transmitted by another base station B(x) using a weight set V(j) in the terminal device 100-1 is represented as follows.

$$RSRP(B(x) \text{ with } V(j)) \quad \text{[Math. 4]}$$

As described above, even in the first RS transmission case, the terminal device 100-1 can measure received power similarly to the second RS transmission case.

(c-2) Second RS Transmission Case

As described above, in the second RS transmission case (that is, a case in which reference signals for measurement multiplied by different weight sets are transmitted using the same radio resources), received power common to the weight set V is measured. Therefore, for example, in the second case, received power of a reference signal for measurement transmitted by the target base station B(0) using the weight set V in the terminal device 100-1 is represented as follows.

$$RSRP(B(0) \text{ with } V) \quad \text{[Math. 5]}$$

Similarly, received power of a reference signal for measurement transmitted by another base station B(x) using the weight set V in the terminal device 100-1 is represented as follows.

$$RSRP(B(x) \text{ with } V) \quad \text{[Math. 6]}$$

(d) Received Quality of Reference Signal for Measurement

Received quality of a reference signal for measurement in the terminal device 100-1 is represented by "RSRQ"

(d-1) First RS Transmission Case

For example, in the first RS transmission case, for example, the second received power information indicates received power of a reference signal for measurement transmitted by the other base station B(x) using the weight set V(j) in the terminal device 100-1. Then, received quality of a reference signal for measurement transmitted by the target base station B(0) using the weight set V(i) in the terminal device 100-1 is calculated based on the second received power information. In this case, the received quality is represented as follows.

$$RSRQ(B(0) \text{ with } V(i), B(x) \text{ with } V(j)) \quad \text{[Math. 7]}$$

Even in the first RS transmission case, the terminal device 100-1 can calculate received quality similarly to the second RS transmission case.

(d-2) Second RS Transmission Case

For example, in the second RS transmission case, for example, the second received power information indicates received power of a reference signal for measurement transmitted by the other base station B(x) using the weight set V in the terminal device 100-1. Then, received quality of a reference signal for measurement transmitted by the target base station B(0) using the weight set V in the terminal device 100-1 is calculated based on the second received power information.

In this case, the received quality is represented as follows.

$$RSRQ(B(0) \text{ with } V, B(x) \text{ with } V) \quad \text{[Math. 8]}$$

(Received Quality in First RS Transmission Case)

First, in the first RS transmission case in which reference signals for measurement multiplied by different weight sets are transmitted using different radio resources, an example of the method of calculating received quality of a reference for measurement transmitted by the target base station B(0) using the weight set V(i) in the terminal device 100-1 will be described.

The control unit 145 calculates the received quality based on the first received power information and the second received power information.

The first received power information indicates received power of a reference signal for measurement transmitted by the target base station B(0) using the weight set V(i) in a terminal device. As described above, the received power is represented as follows.

$$RSRP(B(0) \text{ with } V(i)) \quad \text{[Math. 9]}$$

(a) Another Base Station and One Weight Set (a-1) Second Received Power Information For example, the information acquiring unit 143 acquires the first received power information and the second received power information of one weight set for another base station.

As an example, the information acquiring unit 143 acquires the second received power information of another weight set V(n) for another base station B(a). Received power indicated by the second received power information is represented as follows.

TABLE 1

| Another base station | Weight set | Second received power information (received power) |
|---|---|---|
| B(a) | V(n) | RSRP(B(a) with V(n)) |

(a-2) Calculation of Received Quality

As an example, the control unit 145 calculates the received quality by performing division using received power indicated by the first received power information and received power indicated by the second received power information. Specifically, for example, the control unit 145 calculates the received quality as follows.

$$RSRQ(B(0) \text{ with } V(i), B(a) \text{ with } V(n)) = \quad \text{[Math. 10]}$$
$$\frac{RSRP(B(0) \text{ with } V(i))}{RSRP(B(a) \text{ with } V(n))}$$

It should be noted that the received quality calculated by this method is received quality in the target base station B(0) when the target base station B(0) uses the weight set V(i) and the other base station B(a) uses the weight set V(n). That is in this method, the other base station B(a) that uses the weight set V(n) is considered to be an interference source.

In this method, the other base station B(a) that uses a weight set v(i) other than the weight set V(n) and a base station B(x) other than the other base station B(a) are not considered to be interference sources.

(a-3) Weight Set
—Received Power

For example, the weight set used by the other base station is a weight set that provides higher received power in the terminal device 100-1 than other weight sets. Specifically, for example, the weight set V(n) used by the other base station B(a) provides higher received power than the other weight sets among weight sets V(j) (j=0, 1, 2, 3, . . . ). Accordingly, for example, when received quality is calculated, a higher interference source is considered. That is, for example, received quality when interference is high is calculated.

—Designation

The weight set used by the other base station may be a designated weight set. Specifically, the weight set used by the other base station may be a weight set that is designated by a network (for example, the base station 200-1 or a core network node). Accordingly, for example, when a weight set that is used by a base station in the network is determined or when a weight set that is used by the base station can be adjusted, it is possible to calculate received quality with high accuracy.

(b) Plurality of Other Base Stations (b-1) Second Received Power Information

For example, the information acquiring unit 143 acquires the second received power information for each of a plurality of other base stations. For example, the plurality of other base stations are base stations that are positioned around the terminal device 100-1.

For example, the information acquiring unit 143 acquires the first received power information and the second received power information of one weight set for each of the plurality of other base stations.

As an example, the information acquiring unit 143 acquires the second received power information of one weight set $V(n_x)$ for each of three other base stations B(x) (x=1, 2, 3). That is, the information acquiring unit 143 acquires second received power information of a weight set $V(n_1)$ for another base station B(1), second received power information of a weight set $V(n_2)$ for another base station B(2); and second received power information of a weight set $V(n_3)$ for another base station B(3). Received power indicated by such second received power information is represented as follows,

TABLE 2

| Other base stations | Weight sets | Second received power information (received power) |
|---|---|---|
| B(1) | $V(n_1)$ | $RSRP(B(1)$ with $V(n_1))$ |
| B(2) | $V(n_2)$ | $RSRP(B(2)$ with $V(n_2))$ |
| B(3) | $V(n_3)$ | $RSRP(B(3)$ with $V(n_3))$ |

Weight sets used by other base stations may be different among the plurality of other base stations. Any two of the weight set $V(n_1)$, the weight set. $V(n_2)$ and the weight set V(n) may be different from each other.

(b-2) Calculation of Received Quality

For example, the control unit 145 calculates the received, quality based on the first received power information and the second received power information for each of the plurality of other base stations.

Specifically, for example, the control unit 145 calculates the received quality based on first received power indicated by the first received power information and second received power calculated based on the second received power information for each of the plurality of other base stations. For example, the second received power is a sum of received powers indicated by the second received power information. As an example, the second received power is represented as follows $$\sum_{x=1}^{3} RSRP(B(x) \text{ with } V(n_x)) \qquad \text{[Math. 11]}$$

More specifically, for example, the control unit 145 calculates the received quality by performing division using the first received power and the second received power. Specifically, for example, the control unit 145 calculates the received quality as follows.

$$RSRQ(B(0) \text{ with } V(i), B(x)_{x=1 \text{ to } 3} \text{ with } V(n_x)) = \qquad \text{[Math. 12]}$$
$$\frac{RSRP(B(0) \text{ with } V(i)}{\sum_{x=1}^{3} RSRP(B(x) \text{ with } V(n_x))}$$

It should be noted that the received quality calculated by this method is received quality in the target base station B(0) when the target base station B(0) uses the weight set V(i) and other base stations B(x) (x=1, 2, 3) use the weight set $V(n_x)$. That is, in this method, the other base stations B(x) (x=1, 2, 3) that use the weight set $V(n_x)$ are considered to be interference sources.

In this method, the other base stations B(x) (x=1, 2, 3) that use a weight set V(j) other than the weight set $V(n_x)$ are not considered to be interference sources.

For example, as described above, the control unit 145 calculates the received quality based on the first received power information and the second received power information for each of the plurality of other base stations. Accordingly, for example, more accurate received quality is calculated in consideration of interference from the plurality of other base stations that are positioned around the terminal device 100-1. As a result, a cell that is more preferable for the terminal device 100-1 may be selected.

(b-3) Weight Set

—Received Power

For example, the weight set used by the other base station is a weight set that provides higher received power in the terminal device 100-1 than other weight sets. Specifically, for example, the weight set $V(n_x)$ used by the other base stations B(x) provides higher received power than the other weight sets among weight sets V(j) (j=0, 1, 2, 3, . . . ). Accordingly, for example, a higher interference source is considered when received quality is calculated. That is, for example, received quality when interference is high is calculated.

—Designation

The weight set used by the other base station may be a designated weight set. Specifically, the weight set used by the other base station may be a weight set that is designated by a network (for example, the base station 200-1 or a core network node). Accordingly, for example, when a weight set that is used by a base station in the network is determined or when a weight set that is used by the base station can be adjusted, it is possible to calculate received quality with high accuracy.

(c) Two or More Weight Sets (c-1) Second Received Power Information

For example, the information acquiring unit 143 acquires the second received power information of each of two or more weight sets.

For example, the information acquiring unit 143 acquires the first received power information and the second received power information of two or more weight sets for another base station.

As an example, the information acquiring unit 143 acquires the second received power information of four weight sets V(j) (j=0, 1, 2, 3) for another base station B(a). That is, the information acquiring unit 143 acquires second received power information of the weight set V(0) for the other base station B(a), second received power information of the weight set V(1) for the other base station B(a), second received power information of the weight set V(2) for the other base station B(a), and second received power information of the weight set V(3) for the other base station B(a). Received power indicated by such second received power information is represented as follows.

TABLE 3

| Other base stations | Weight sets | Second received power information (received power) |
|---|---|---|
| B(a) | V(0) | RSRP(B(a) with V(0)) |
| B(a) | V(1) | RSRP(B(a) with V(1)) |
| B(a) | V(2) | RSRP(B(a) with V(2)) |
| B(a) | V(3) | RSRP(B(a) with V(3)) |

(c-2) Calculation of Received Quality

For example, the control unit 145 calculates the received quality based on the first received power information and the second received power information of each of the two or more weight sets.

Specifically, for example, the control unit 145 calculates the received quality based on first received power indicated by the first received power information and second received power calculated based on the second received power information of each of the two or more weight sets. For example, the second received power is a sum of received powers indicated by the second received power information. As an example, the second received power is represented as follows.

$$\sum_{j=0}^{3} RSRP(B(a) \text{ with } V(j))$$ [Math. 13]

More specifically, for example, the control unit 145 calculates the received quality by performing division using the first received power and the second received power. Specifically, for example, the control unit 145 calculates the received quality as follows.

$$RSRQ(B(0) \text{ with } V(i), B(a) \text{ with } V(j)_{j=0 \text{ to } 3}) = \frac{RSRP(B(0) \text{ with } V(i))}{\sum_{j=0}^{3} RSRP(B(a) \text{ with } V(j))}$$ [Math. 14]

It should be noted that the received quality calculated by this method is received quality in the target base station B(0) when the target base station B(0) uses the weight set V(i) and the other base station B(a) uses the weight set V(j) (j=0, 1, 2, 3). That is, in this method, the other base station B(a) that uses the weight set V(j) (j=0, 1, 2, 3) is considered to be an interference source.

In this method, the base station B(x) other than the other base station B(a) is not considered to be an interference source.

For example, as described above, the control unit 145 calculates the received quality based on the first received power information and the second received power information of each of the two or more weight sets. Accordingly, more accurate received quality is calculated in consideration of interference from other base stations that use the two or more weight sets. As a result, a cell that is more preferable for the terminal device 100-1 may be selected.

(c-3) Weight Set

—Received Power

For example, the two or more weight sets are weight sets that provide higher received power in the terminal device 100-1 than other weight sets. Specifically, for example, the weight sets V(0), V(1), V(2), and V(3) used by the other base station B(a) provide higher received power than the other weight sets among weight sets V(j) (j=0, 1, 2, 3, 4, ... ). Accordingly, for example, a higher interference source is considered when received quality is calculated. That is, for example, received quality when interference is high is calculated.

—Designation

The two or more weight sets may be designated weight sets. Specifically, the two or more weight sets may be weight sets that are designated by a network (for example, the base station 200-1 or a core network node). Accordingly, for example, when a weight set that is used by a base station in the network is determined or when a weight set that is used by the base station can be adjusted, it is possible to calculate received quality with high accuracy.

(d) Plurality of Other Base Stations and Two or More Weight Sets (d-1) Second Received Power Information For example, the information acquiring unit 143 acquires the second received power information of each of two or more weight sets for each of a plurality of other base stations. For example, the plurality of other base stations are base stations that are positioned around the terminal device 100-1.

As an example, the information acquiring unit 143 acquires the second received power information of four weight sets $V(n_{x,k})$ (k=0, 1, 2, 3) for three other base stations B(x) (x=1, 2, 3). That is, the information acquiring unit 143 acquires second received power information of a weight set $V(n_{10})$ for another base station B(1), second received power information of a weight set $V(n_{11})$ for the other base station B(1), second received power information of a weight set $V(n_{12})$ for the other base station B(1), and second received power information of a weight set $V(n_{13})$ for the other base station B(1). The information acquiring unit 143 acquires second received power information for each weight set for other base stations B(2) and B(3) similarly to the other base station B(1). Received power indicated by such second received power information is represented as follows.

TABLE 4

| Other base stations | Weight sets | Second received power information (received power) |
|---|---|---|
| B(1) | V($n_{10}$) | RSRP(B(1) with V($n_{10}$)) |
| B(1) | V($n_{11}$) | RSRP(B(1) with V($n_{11}$)) |
| B(1) | V($n_{12}$) | RSRP(B(1) with V($n_{12}$)) |
| B(1) | V($n_{13}$) | RSRP(B(1) with V($n_{13}$)) |
| B(2) | V($n_{20}$) | RSRP(B(2) with V($n_{20}$)) |
| B(2) | V($n_{21}$) | RSRP(B(2) with V($n_{21}$)) |
| B(2) | V($n_{22}$) | RSRP(B(2) with V($n_{22}$)) |
| B(2) | V($n_{23}$) | RSRP(B(2) with V($n_{23}$)) |
| B(3) | V($n_{30}$) | RSRP(B(3) with V($n_{30}$)) |
| B(3) | V($n_{31}$) | RSRP(B(3) with V($n_{31}$)) |
| B(3) | V($n_{32}$) | RSRP(B(3) with V($n_{32}$)) |
| B(3) | V($n_{33}$) | RSRP(B(3) with V($n_{33}$)) |

The two or more weight sets may be different among the plurality of other base stations. Any two of a weight set V($n_{1k}$) (k=0, 1, 2, 3, 4), a weight set V($n_{2k}$) (k=0, 1, 2, 3, 4), and a weight set V($n_{3k}$) (k=0, 1, 2, 3, 4) may be different from each other.

(d-2) Calculation of Received Quality

For example, the control unit 145 calculates the received quality based on the first received power information and the second received power information of each of the two or more weight sets for each of the plurality of other base stations.

Specifically, for example, the control unit 145 calculates the received quality based on first received power indicated by the first received power information and second received power calculated based on the second received power information of each of the two or more weight sets for each of the plurality of other base stations. For example, the second received power is a sum of received powers indicated by the second received power information. As an example, the second received power is represented as follows.

$$\sum_{x=1}^{3}\sum_{k=0}^{3} RSRP(B(x) \text{ with } V(n_{xk}))$$ [Math. 15]

More specifically, for example, the control unit 145 calculates the received quality by performing division using the first received power and the second received power. Specifically, for example, the control unit 145 calculates the received quality as follows.

$$RSRQ(B(0) \text{ with } V(i), B(x)_{x=1 \text{ to } 3} \text{ with } V(n_{xk})_{k=0 \text{ to } 3}) = \frac{RSRP(B(0) \text{ with } V(i))}{\sum_{x=1}^{3}\sum_{k=0}^{3} RSRP(B(x) \text{ with } V(n_{xk}))}$$ [Math. 16]

It should be noted that the received quality calculated by this method is received quality in the target base station B(0) when the target base station B(0) uses the weight set V(i) and other base stations B(x) (x=1, 2, 3) use the weight set V(n) (k=0, 1, 2, 3). That is, in this method, the other base stations B(x) (x=1, 2, 3) that use the weight set V(n) (k=0, 1, 2, 3) are considered to be interference sources.

For example, as described above, the control unit 145 calculates the received quality based on the first received power information and the second received power information of each of the two or more weight sets for each of the plurality of other base stations. Accordingly, more accurate received quality is calculated in consideration of interference from the plurality of other base stations that use two or more weight sets. As a result, a cell that is more preferable for the terminal device 100-1 may be selected.

(d-3) Weight Set

—Received Power

For example, the two or more weight sets are weight sets that provide higher received power in the terminal device 100-1 than other weight sets. Specifically, for example, the weight set V($n_{xk}$) (k=0, 1, 2, 3) used by the other base station B(x) provides higher received power than the other weight sets among weight sets V(j) (j=0, 1, 2, 3, . . . ). Accordingly, for example, a higher interference source is considered when received quality is calculated. That is, for example, received quality when interference is high is calculated.

—Designation

The two or more weight sets may be designated weight sets. Specifically, the two or more weight sets may be weight sets that are designated by a network (for example, the base station 200-1 or a core network node). Accordingly, for example, when a weight set that is used by a base station in the network is determined or when a weight set that is used by the base station can be adjusted, it is possible to calculate received quality with high accuracy.

The method of calculating received quality in the first RS transmission case has been described above. Even in the first RS transmission case it is possible to calculate received quality similarly to the second RS transmission case to be described. As an example, when received power information indicating a total sum of received powers for all weight sets V is used, received quality may be calculated similarly to the second RS transmission case to be described.

(Received Quality in Second RS Transmission Case)

Next, in the second RS transmission case in which reference signals for measurement multiplied by different weight sets are transmitted using the same radio resources, an example of the method of calculating received quality of a reference for measurement transmitted by the target base station B(0) using the weight set V in the terminal device 100-1 will be described.

The control unit 145 calculates the received quality based on the first received power information and the second received power information.

The first received power information indicates received power of a reference signal for measurement transmitted by the target base station B(0) using the weight set V in a terminal device. As described above, the received power is represented as follows.

$$RSRP(B(0) \text{ with } V)$$ [Math. 17]

(a) Another Base Station (a-1) Second Received Power Information

For example, the information acquiring unit 143 acquires the first received power information and the second received power information for another base station.

As an example, the information acquiring unit 143 acquires the second received power information for another base station B(a). Received power indicated by the second received power information is represented as follows.

TABLE 5

| Another base station | Second received power information (received power) |
|---|---|
| B(a) | RSRP(B(a) with V) |

(a-2) Calculation of Received Quality

As an example, the control unit 145 calculates the received quality by performing division using received power indicated by the first received power information and the received power indicated by the second received power information. Specifically, for example, the control unit 145 calculates the received quality as follows, $$RSRQ(B(0) \text{ with } V, B(a) \text{ with } V) = \frac{RSRP(B(0) \text{ with } V)}{RSRP(B(a) \text{ with } V)} \quad \text{[Math. 18]}$$

It should be noted that the received quality calculated by this method is received quality in the target base station B(0) when the target base station B(0) and the other base station B(a) use the weight set V. That is, in this method, the other base station B(a) that uses the weight set V is considered to be an interference source.

In this method, the base station B(x) other than the other base station B(a) is not considered to be an interference source.

(b) Plurality of Other Base Stations
(b-1) Second Received Power Information

For example, the information acquiring unit 143 acquires the second received power information for each of a plurality of other base stations. For example, the plurality of other base stations are base stations that are positioned around the terminal device 100-1.

As an example, the information acquiring unit 143 acquires the second received power information for each of three other base stations B(x) (x=1, 2, 3). That is, the information acquiring unit 143 acquires second received power information for the base station B(1), second received power information for the base station B(2), and second received power information for the base station B(3). Received power indicated by such second received power information is represented as follows.

TABLE 6

| Other base stations | Second received power information (received power) |
|---|---|
| B(1) | RSRP(B(1) with V) |
| B(2) | RSRP(B(2) with V) |
| B(3) | RSRP(B(3) with V) |

(b-2) Calculation of Received Quality

For example, the control unit 145 calculates the received quality based on the first received power information and the second received power information for each of the plurality of other base stations Specifically, for example, the control unit 145 calculates the received quality based on first received power indicated by the first received power information and second received power calculated based on the second received power information for each of the plurality of other base stations. For example, the second received power is a sum of received powers indicated by the second received power information. As an example, the second received power is represented as follows.

$$\sum_{x=1}^{3} RSRP(B(x) \text{ with } V) \quad \text{[Math. 19]}$$

More specifically, for example, the control unit 145 calculates the received quality b performing division using the first received power and the second received power. Specifically, for example, the control unit 145 calculates the received quality as follows.

$$RSRQ(B(0) \text{ with } V, B(x)_{x=1 \text{ to } 3} \text{ with } V) = \frac{RSRP(B(0) \text{ with } V)}{\sum_{x=1}^{3} RSRP(B(x) \text{ with } V)} \quad \text{[Math. 20]}$$

It should be noted that the received quality calculated by this method is received quality in the target base station B(0) when the target base station B(0) and other base stations B(x) (x=1, 2, 3) use the weight set V. That is, in this method, the other base stations B(x) (x=1, 2, 3) that use the weight set V are considered to be interference sources.

For example, as described above, the control unit 145 calculates the received quality based on the first received power information and the second received power information for each of the plurality of other base stations. Accordingly, for example, more accurate received quality is calculated in consideration of interference from the plurality of other base stations that are positioned around the terminal device 100-1. As a result, a cell that is more preferable for the terminal device 100-1 may be selected.

(Target Base Station)
(a) Target Base Station

As described above, the target base station is a base station serving as a target whose received quality will be calculated. For example, the processing unit 140 (for example, the control unit 145) selects the target base station from among the plurality of base stations that are positioned around the terminal device 100-1. As an example, the processing unit 140 selects a base station of a measurement target cell (for example, a serving cell and a neighbor cell) as the target base station. As a result, received quality in the selected base station is calculated.

It should be understood that not only one target base station but also two or more target base stations may be selected. As a result, received quality in each of the two or more target base stations may be calculated.

(b) Weight Set Used by Target Base Station

As described above, in the first RS transmission case, the received quality can be calculated for each weight set used by the target base station. For example, the processing unit 140 (for example, the control unit 145) selects a weight set from among a plurality of weight sets used by the target base station. As a result, received quality for the selected weight set is calculated.

It should be understood that not only one weight set but also two or more weight sets may be selected. As a result, received quality for each of the two or more weight sets may be calculated.

<5.3. Process Flow>

Next, an example of a process according to the first embodiment will be described with reference to FIG. 12. FIG. 12 is a flowchart illustrating an example of a schematic flow of a process according to the first embodiment. The process is performed by the terminal device 100-1.

The information acquiring unit 143 acquires first received power information indicating received power of a reference signal for measurement transmitted by a target base station using a weight set for beamforming in the terminal device 100-1 (S301).

In addition, the information acquiring unit 143 acquires second received power information indicating received power of a reference signal for measurement transmitted by another base station using a weight set for beamforming in the terminal device 100-1 (S303).

Then, the control unit 145 calculates received quality of the reference signal transmitted by the target base station in the terminal device 100-1 based on the first received power information and the second received power information (S305). Then, the process ends.

The first embodiment has been described above. According to the first embodiment, for example, it is possible to select a cell that is more preferable for the terminal device 100-1 in an environment in which beamforming is performed. More specifically, for example, received quality in the target base station is calculated based on received power (that is, received power indicated by first received power information) in the target base station and interference (that is, received power indicated by second received power information) in the environment in which beamforming is performed. Therefore, the received quality may be close to received quality when the terminal device 100-1 performs wireless communication in the environment in which beamforming is performed. Then, the received quality is used when a handover or a cell selection/cell reselection is performed. As a result, a cell that is more preferable for the terminal device 100-1 may be selected.

In addition, since the terminal device 100-1 calculates the received quality in the first embodiment, information for calculating the received quality may not be transmitted to the base station 200-1. Therefore, radio resources may be saved.

6. SECOND EMBODIMENT

Figure 13:
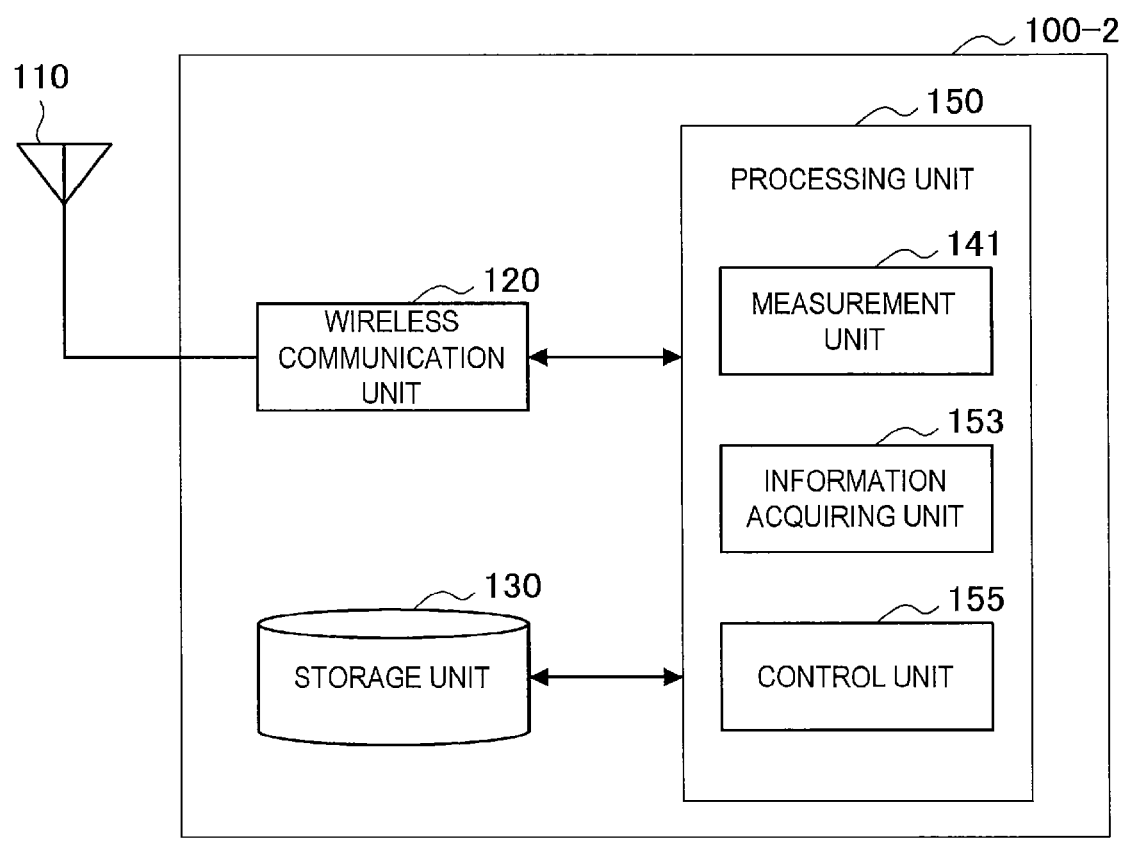
FIG. 13 is a block diagram illustrating an example of a configuration of a terminal device according to a second embodiment.
Figure 14:
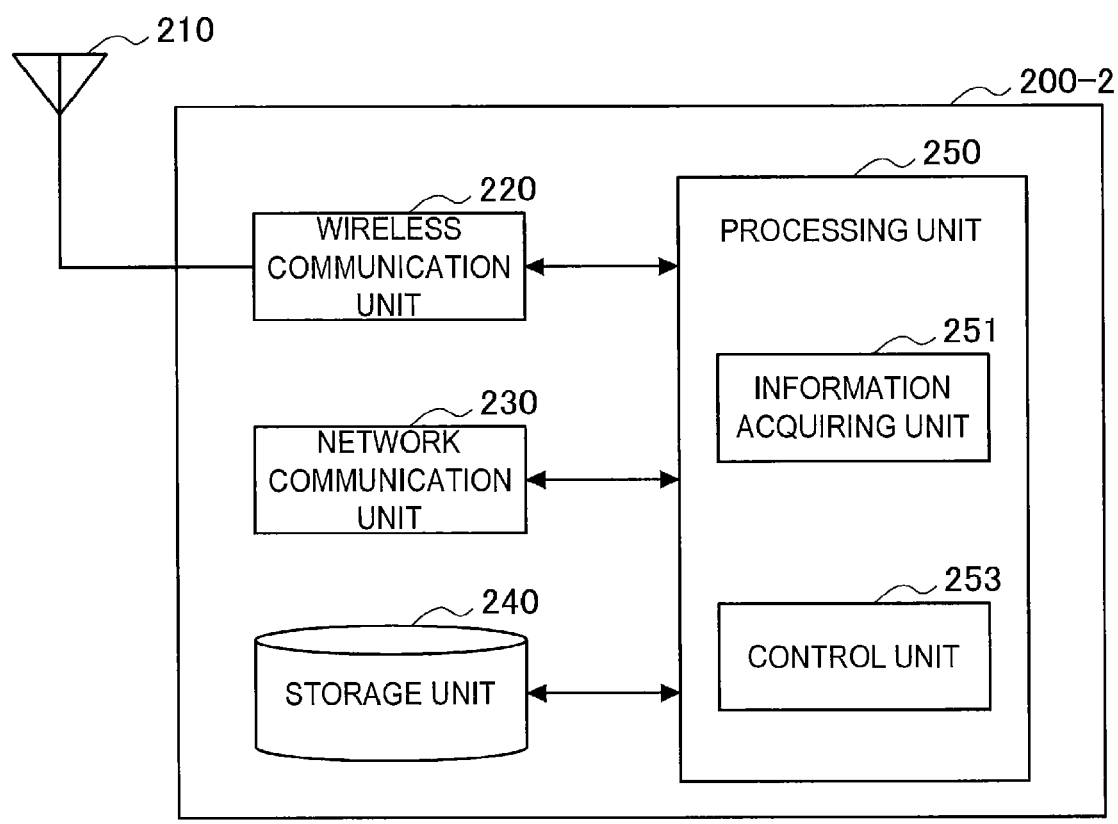
FIG. 14 is a block diagram illustrating an example of a configuration of a base station according to a second embodiment.
Figure 15:
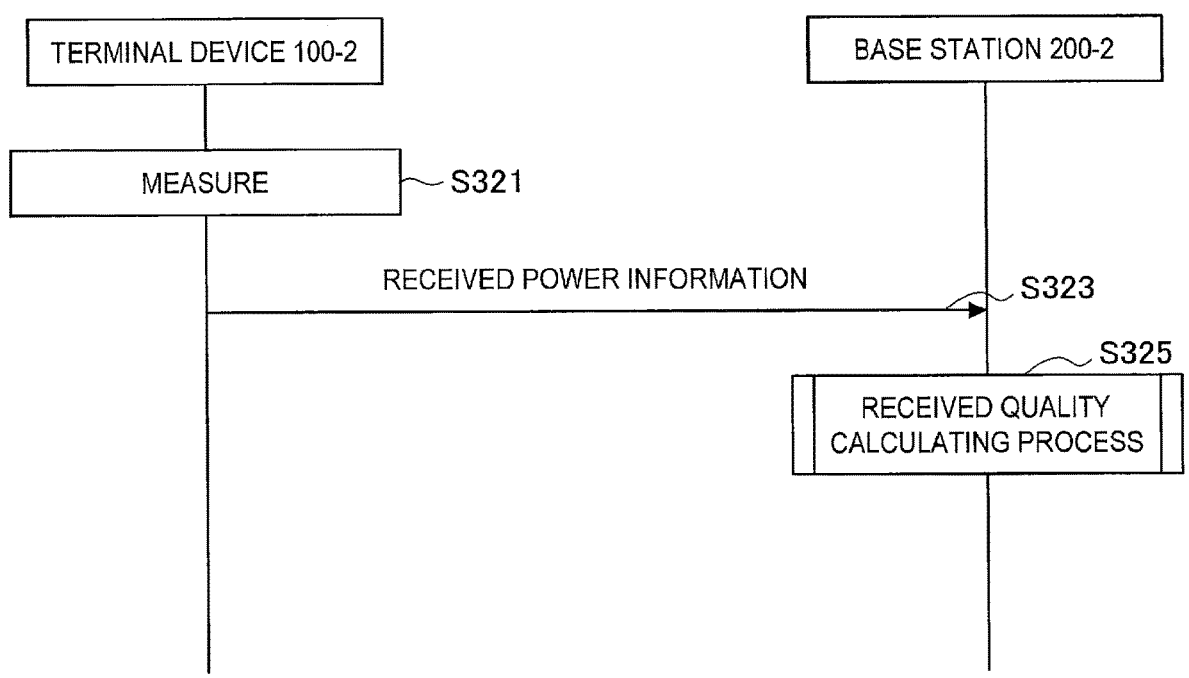
FIG. 15 is a sequence diagram illustrating an example of a schematic flow of a process according to the second embodiment.

Next, the second embodiment of the present disclosure will be described with reference to FIG. 13 to FIG. 15.

While the terminal device 100-1 calculates received quality in the first embodiment, a base station 200-2 calculates received quality in the second embodiment.

<6.1. Configuration of Terminal Device>

First, an example of a configuration of a terminal device 100-2 according to the second embodiment will be described with reference to FIG. 13. FIG. 13 is a block diagram illustrating an example of a configuration of the terminal device 100-2 according to the second embodiment. As illustrated in FIG. 13, the terminal device 100-2 includes the antenna unit 110, the wireless communication unit 120, the storage unit 130 and a processing unit 150.

There is no difference in descriptions of the antenna unit 110, the wireless communication unit 120 and the storage unit 130 between the first embodiment and the second embodiment except for different reference numerals. Therefore, redundant descriptions will be omitted here, and only the processing unit 150 will be described.

(Processing Unit 150)

The processing unit 150 provides various functions of the terminal device 100-2. The processing unit 150 includes the measurement unit 141, an information acquiring unit 153, and a control unit 155. Alternatively, the processing unit 150 may further include a component other than these components. That is, the processing unit 150 may perform an operation other than operations of these components.

There is no difference in descriptions of the measurement unit 141 between the first embodiment and the second embodiment except for different reference numerals. Therefore, redundant descriptions will be omitted here, and only the information acquiring unit 153 and the control unit 155 will be described.

(Information Acquiring Unit 153)

The information acquiring unit 153 acquires received power information indicating received power of a reference signal for measurement transmitted by a base station using a weight set for beamforming in the terminal device 100-2.

For example, the received power information is output by the measurement unit 141. The information acquiring unit 153 acquires the received power information.

For example, the received power information is a candidate for first received power information and second received power information used for calculating received quality.

(Control Unit 155)

The control unit 155 provides the received power information to the base station 200-2.

Specifically, for example, the control unit 155 provides the received power information to the base station 200-2 periodically and/or according to a generation of a predetermined event. The control unit 155 provides the received power information to the base station 200-2 through the antenna unit 110 and the wireless communication unit 120.

<6.2. Configuration of Base Station>

Next, an example of a configuration of the base station 200-2 according to the second embodiment will be described with reference to FIG. 14. FIG. 14 is a block diagram illustrating an example of a configuration of the base station 200-2 according to the second embodiment. As illustrated in FIG. 14, the base station 200-2 includes the antenna unit 210, the wireless communication unit 220, the network communication unit 230, the storage unit 240 and a processing unit 260.

(Antenna Unit 210)

The antenna unit 210 emits a signal to be output by the wireless communication unit 220 into space as radio waves. In addition, the antenna unit 210 converts spatial radio waves into a signal and outputs the signal to the wireless communication unit 220.

For example, the antenna unit 210 includes a directional antenna. For example, the directional antenna is a directional antenna capable of large-scale MIMO.

In addition, for example, the antenna unit 210 further includes an omnidirectional antenna. Alternatively, the antenna unit 210 may include a sector antenna with or without an omnidirectional antenna.

(Wireless Communication Unit 220)

The wireless communication unit 220 transmits and receives signals. For example, the wireless communication unit 220 transmits a downlink signal to the terminal device 100-2 and receives an uplink signal from the terminal device 100-2.

(Network Communication Unit 230)

The network communication unit 230 transmits and receives information. For example, the network communication unit 230 transmits information to another node and receives information from the other node. For example, the other node includes another base station and a core network node.

(Storage Unit 240)

The storage unit 240 stores programs and data for operations of the base station 200-2.

(Processing Unit 250)

The processing unit 250 provides various functions of the base station 200-2. The processing unit 250 includes an information acquiring unit 251 and a control unit 253.

Alternatively, the processing unit 250 may further include a component other than these components. That is, the processing unit 250 may also perform an operation other than operations of these components.

(Information Acquiring Unit 251)

The information acquiring unit 251 acquires received power information indicating received power of a reference signal for measurement transmitted by a base station using a weight set for beamforming in the terminal device 100-2.

For example, the terminal device 100-2 provides the received power information to the base station 200-2. Then, the received power information is stored in the storage unit 240. The information acquiring unit 251 acquires the received power information from the storage unit 240 at any timing thereafter.

(a) First Received Power Information

The information acquiring unit 251 acquires first received power information indicating received power of a reference signal for measurement transmitted by a target base station using a weight set for beamforming in the terminal device 100-2.

The target base station is a base station serving as a target whose received quality will be calculated. That is, the target base station is changed according to a base station whose received quality will be calculated. As an example, the processing unit 250 (for example, the control unit 253) selects the target base station from among a plurality of base stations that are positioned around the terminal device 100-2.

(b) Second Received Power Information

The information acquiring unit 251 acquires second received power information indicating received power of a reference signal for measurement transmitted by another base station using a weight set for beamforming in the terminal device 100-2.

The other base station is a base station that is different from the base station serving as a target whose received quality will be calculated. That is, the other base station may also be changed according to a base station whose received quality will be calculated.

When the terminal device 100-2 wirelessly communicates with the target base station, the other base station serves as an interference source of the terminal device 100-2 and the target base station. Therefore, it should be noted that the second received power information indicates interference power.

(Control Unit 253)

(a) Calculation of Received Quality

The control unit 253 calculates received quality of the reference signal transmitted by the target base station in the terminal device 100-2 based on the first received power information and the second received power information.

(b) Handover

For example, the control unit 253 decides a handover of the terminal device 100-2 based on received quality information indicating the calculated received quality.

Specifically, for example, the control unit 253 selects a base station associated with favorable received quality as a handover target base station of the terminal device 100-2. Then, the control unit 253 decides to handover the terminal device 100-2 to the selected base station.

(Others)

The base station 200-2 transmits, for example, a reference signal for measurement using a weight set for beamforming. More specifically, for example, the base station 200-2 (for example, the processing unit 250) maps a reference signal for measurement to radio resources and multiplies the reference signal by a weight set.

<6.3. Method of Calculating Received Quality>

There is no difference in descriptions of the method of calculating received quality between the first embodiment and the second embodiment except a difference in the main entity (that is, the terminal device 100-1 is the main entity in the first embodiment and the base station 200-2 is the main entity in the second embodiment). Therefore, redundant descriptions will be omitted here. In the second embodiment, "information acquiring unit 143" is replaced by "information acquiring unit 251," "control unit 145" is replaced by "control unit 253," and "processing unit 140" is replaced by "processing unit 250."

<6.4. Process Flow>

Next, an example of a process according to the second embodiment will be described with reference to FIG. 15. FIG. 15 is a sequence diagram illustrating an example of a schematic flow of a process according to the second embodiment.

The terminal device 100-2 (the measurement unit 141) measures received power of a reference signal for measurement transmitted by a base station using a weight set for beamforming in the terminal device 100-2 (S321).

Then, the terminal device 100-2 (the control unit 155) provides received power information indicating the received power to the base station 200-2 (S323).

Then, the base station 200-2 performs a received quality calculating process (S325). That is, the base station 200-2 (the information acquiring unit 251) acquires first received power information indicating received power of a reference signal for measurement transmitted by a target base station using a weight set for beamforming in the terminal device 100-2. In addition, the base station 200-2 (the information acquiring unit 251) acquires second received power information indicating received power of a reference signal for measurement transmitted by another base station using a weight set for beamforming in the terminal device 100-2. Then, the base station 200-2 (the control unit 253) calculates received quality of the reference signal transmitted by the target base station in the terminal device 100-2 based on the first received power information and the second received power information. Then, the process ends.

An example of a schematic flow of the received quality calculating process is the same as the example of a schematic flow of a process according to the first embodiment described with reference to FIG. 12 except for, for example, a difference in the main entities. In the second embodiment, "information acquiring unit 143" is replaced by "information acquiring unit 251" and "control unit 145" is replaced by "control unit 253."

The second embodiment has been described above. Similarly to the first embodiment, according to the second embodiment, it is possible to select a cell that is more preferable for the terminal device 100-2 in an environment in which beamforming is performed.

In addition, in the second embodiment, the terminal device 100-2 provides received power information to the base station 200-2, and the base station 200-2 calculates the received quality based on the received power information. Therefore, for example, the base station 200-2 can freely calculate various types of received quality by combining received quality information.

7. THIRD EMBODIMENT

Figure 16:
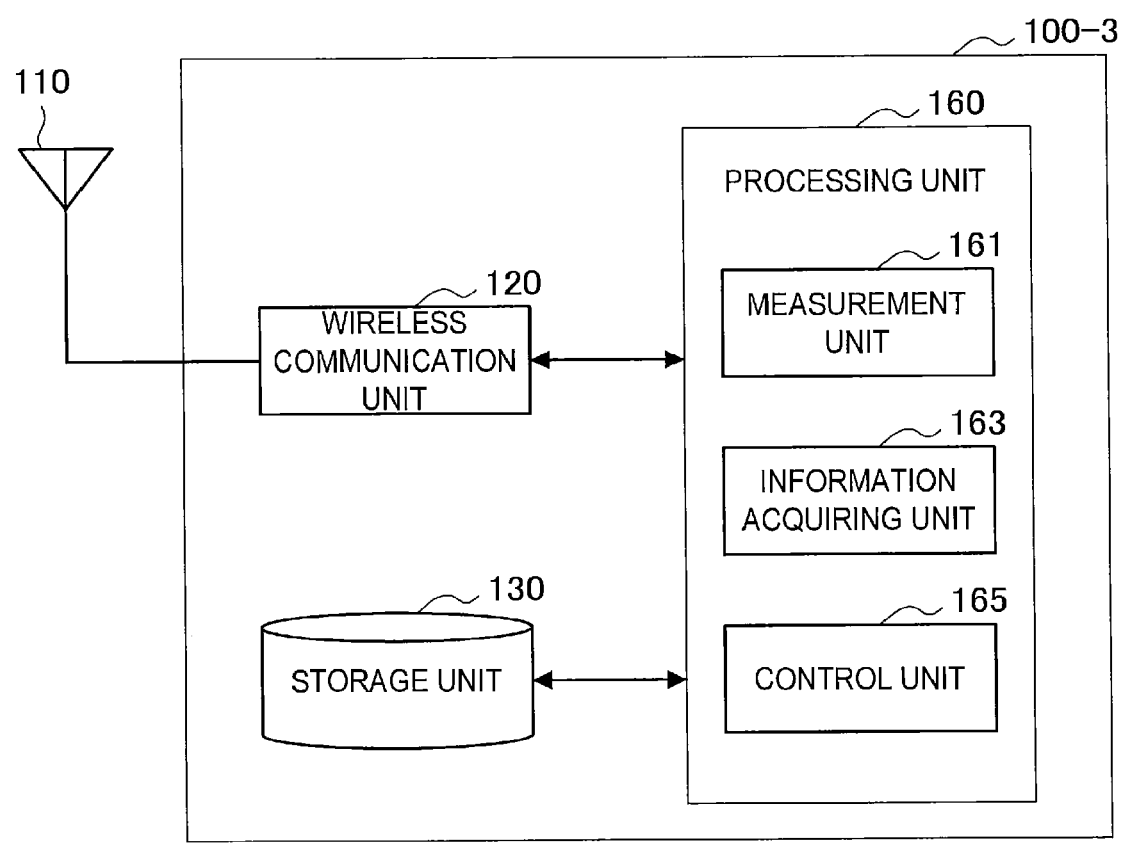
FIG. 16 is a block diagram illustrating an example of a configuration of a terminal device according to a third embodiment.
Figure 17:
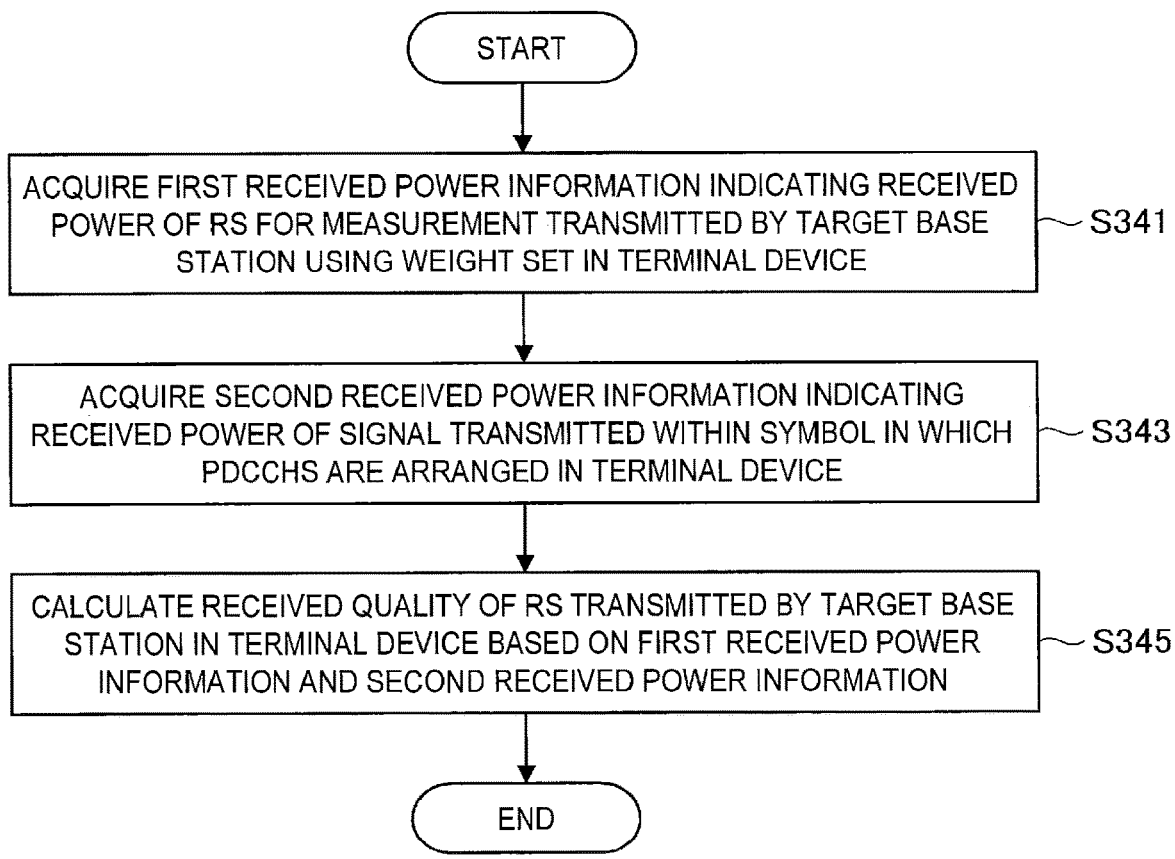
FIG. 17 is a flowchart illustrating an example of a schematic flow of a process according to the third embodiment.

Next, a third embodiment of the present disclosure will be described with reference to FIG. 16 and FIG. 17.

<7.1. Configuration of Terminal Device>

First, an example of a configuration of the terminal device 100-3 according to the third embodiment will be described with reference to FIG. 16. FIG. 16 is a block diagram illustrating an example of a configuration of the terminal device 100-3 according to the third embodiment. As illustrated in FIG. 16, the terminal device 100-3 includes an antenna unit 110, a wireless communication unit 120, a storage unit 130 and a processing unit 160.

There is no difference in descriptions of the antenna unit 110, the wireless communication unit 120, and the storage unit 130 between the first embodiment and the third embodiment except for different reference numerals. Therefore, redundant descriptions will be omitted here, and only the processing unit 160 will be described.

(Processing Unit 160)

The processing unit 160 provides various functions of the terminal device 100-3. The processing unit 160 includes a measurement unit 161, an information acquiring unit 163 and a control unit 165. The processing unit 160 may further include a component other than these components. That is, the processing unit 160 may also perform an operation other than operations of these components.

(Measurement Unit 161)

(a) Measurement of Received Power of Reference Signal Transmitted Using Weight Set The measurement unit 161 measures received power of a reference signal for measurement transmitted by a base station using a weight set for beamforming in the terminal device 100-3. For example, the measurement unit 161 outputs received power information indicating the received power.

There is no difference in descriptions of measurement of the received power between the first embodiment (the measurement unit 141) and the third embodiment (the measurement unit 161). Therefore, redundant descriptions will be omitted here.

(b) Measurement of Received Power of Signal Transmitted within Control Region Symbol The measurement unit 161 measures received power of a signal transmitted within a symbol in which physical downlink control channels (PDCCHs) are arranged (hereinafter referred to as a "control region symbol") in the terminal device 100-3. For example, the measurement unit 161 outputs received power information indicating the received power.

(b-1) Control Region Symbol

As an example, a subframe includes 14 symbols (for example, 14 OFDMA symbols) and PDCCHs are arranged in the 1st to 3rd symbols. That is, the 1st to 3rd symbols are each a control region symbol. In this case, the measurement unit 161 measures received power of a signal transmitted within one or more control region symbols among the three control region symbols (that is, the 1st to 3rd symbols) in the terminal device 100-3.

As another example, a subframe includes 12 symbols (for example, 12 OFDMA symbols) and PDCCHs may be arranged in the 1st and 2rd symbols. That is, the 1st and 2rd symbols may each be a control region symbol. In this case, the measurement unit 161 may measure received power of a signal transmitted within at least one control region symbol between the two control region symbols (that is, the 1st and 2rd symbols) in the terminal device 100-3.

As still another example, a subframe includes 6 symbols (for example, 6 OFDMA symbols), and PDCCHs may be arranged in the 1st symbol. That is, the 1st symbol may be a control region symbol. In this case, the measurement unit 161 may measure received power of a signal transmitted within the one control region symbol (that is, the 1st symbol) in the terminal device 100-3.

(b-2) Frequency Direction

As an example, the measurement unit 161 measures received power of a signal transmitted using radio resources across an entire frequency band within the control region symbol in the terminal device 100-3. More specifically, for example, the measurement unit 161 measures received power of a signal transmitted using resource elements across all component carriers (CCs) within the control region symbol in the terminal device 100-3.

As another example, the measurement unit 161 may measure received power of a signal transmitted using radio resources across some bands of frequency bands within the control region symbol in the terminal device 100-3. More specifically, the measurement unit 161 may measure received power of a signal transmitted using resource elements across some bands of CCs within the control region symbol in the terminal device 100-3.

(b-3) Specific Process

As described above, the measurement unit 161 measures received power of a signal transmitted within the control region symbol in the terminal device 100-3.

For example, the measurement unit 161 measures received power for each predetermined unit. More specifically, for example, the measurement unit 141 calculates a total sum of received powers of signals transmitted within the control region symbols in the terminal device 100-3, divides the total sum by the number of predetermined units, and thus measures received power for each predetermined unit.

As an example, the predetermined unit is a symbol. As another example, the predetermined unit may be a subframe or a resource block.

(Information Acquiring Unit 163)

(a) First Received Power Information

The information acquiring unit 163 acquires first received power information indicating received power of a reference signal for measurement transmitted by a target base station using a weight set for beamforming in the terminal device 100-3.

For example, the first received power information is output by the measurement unit 161. The information acquiring unit 163 acquires the first received power information.

The target base station is a base station serving as a target whose received quality will be calculated. That is, the target base station is changed according to a base station whose received quality will be calculated. As an example, the processing unit 160 (for example, the control unit 165) selects the target base station from among a plurality of base stations that are positioned around the terminal device 100-3.

(a) Second Received Power Information

The information acquiring unit 163 acquires second received power information indicating received power of a signal transmitted within a symbol in which physical downlink control channels are arranged (that is, a control region symbol) in the terminal device 100-3.

For example, the second received power information is output by the measurement unit 161. The information acquiring unit 143 acquires the second received power information.

For example, in a symbol in which control channels are arranged (that is, a control region symbol), no base station transmits a signal using a weight set for beamforming.

Therefore, a signal transmitted in the symbol is not significantly changed according to a weight set used by a base station. Therefore, it should be noted that the second received power information indicates stable received power that is not significantly changed according to beamforming. The received power includes received power of a desired signal, interference and noise (S+I+N).

(Control Unit 165)

(a) Calculation of Received Quality

The control unit 165 calculates received quality of the reference signal transmitted by the target base station in the terminal device 100-3 based on the first received power information and the second received power information. The method of calculating received quality will be described below in detail.

(b) Provision to Base Station

For example, the control unit 165 provides the first received power information to a base station 200-3.

For example, the control unit 165 provides received quality information indicating the calculated received quality to the base station 200-3.

Specifically, for example, the control unit 165 provides the first received power information and the received quality information to the base station 200-3 periodically and/or according to a generation of a predetermined event. The control unit 165 provides the first received power information and the received quality information to the base station 200-3 through the antenna unit 110 and the wireless communication unit 120.

<7.2. Method of Calculating Received Quality>

Next, an example of the method of calculating received quality in the third embodiment will be described.

(Assumed Expression)

(a) Base Station

A base station is represented by "B." Specifically, the target base station is represented by "B(0)."

(b) Weight Set

A weight set is represented by "V" Specifically, an individual weight set is represented by "V(i)" (i=1, 2, 3, . . . ).

(c) Received Power of Reference Signal for Measurement

Received power of a reference signal for measurement in the terminal device 100-3 is represented by "RSRP." There is no difference in descriptions of this point between the first embodiment and the second embodiment. Therefore, redundant descriptions will be omitted here.

(d) Received Power of Signal Transmitted within Control Region Symbol

Received power of a signal transmitted within the control region symbol (that is, a symbol in which PDCCHs are arranged) in the terminal device 100-3 is represented as follows.

$$RSSI_{CONTROL} \qquad \text{[Math. 21]}$$

(e) Received Quality of Reference Signal for Measurement

Received quality of a reference signal for measurement in the terminal device 100-3 is represented by "RSRQ."

(e-1) First RS Transmission Case

For example, in the first RS transmission case, received quality of a reference signal for measurement transmitted by a target base station B(0) using a weight set V(i) in the terminal device 100-3 is represented as follows.

$$RSRQ(B(0) \text{ with } V(i)) \qquad \text{[Math. 22]}$$

Even in the first RS transmission case, similarly to the second RS transmission case, the terminal device 100-3 can calculate received quality.

(e-2) Second RS Transmission Case

For example, in the second RS transmission case, for example, received quality of a reference signal for measurement transmitted by a target base station B(0) using a weight set V in the terminal device 100-3 is represented as follows.

$$RSRQ(B(0) \text{ with } V) \qquad \text{[Math. 23]}$$

(Received Quality in First RS Transmission Case)

First, in the first RS transmission case in which reference signals for measurement multiplied by different weight sets are transmitted using different radio resources, an example of a method of calculating received quality of a reference for measurement transmitted by the target base station B(0) using the weight set V(i) in the terminal device 100-3 will be described.

The control unit 165 calculates the received quality based on the first received power information and the second received power information.

The first received power information indicates received power of a reference signal for measurement transmitted by the target base station B(0) using the weight set V(i) in a terminal device. As described above, the received power is represented as follows.

$$RSRP(B(0) \text{ with } V(i)) \qquad \text{[Math. 24]}$$

The second received power information indicates received power of a signal transmitted within the control region symbol (that is, a symbol in which PDCCHs are arranged) in the terminal device 100-3. As described above, the received power is represented as follows.

$$RSSI_{CONTROL} \qquad \text{[Math. 25]}$$

As an example, the control unit 165 calculates the received quality by performing division using received power indicated by the first received power information and received power indicated by the second received power information. Specifically, for example, the control unit 165 calculates the received quality as follows.

$$RSRQ(B(0) \text{ with } V(i)) = \frac{RSRP(B(0) \text{ with } V(i))}{RSSI_{CONTROL}} \qquad \text{[Math. 26]}$$

(Received Quality in Second RS Transmission Case)

Next, in the second RS transmission case in which reference signals for measurement multiplied by different weight sets are transmitted using the same radio resources, an example of a method of calculating received quality of a reference for measurement transmitted by the target base station B(0) using the weight set V in the terminal device 100-3 will be described.

The control unit 165 calculates the received quality based on the first received power information and the second received power information.

The first received power information indicates received power of a reference signal for measurement transmitted by the target base station B(0) using the weight set V in a terminal device. As described above, the received power is represented as follows.

$$RSRP(B(0) \text{ with } V) \qquad \text{[Math. 27]}$$

The second received power information indicates received power of a signal transmitted within the control region symbol (that is, a symbol in which PDCCHs are arranged) in the terminal device 100-3. As described above, the received power is represented as follows.

$$RSSI_{CONTROL} \quad \text{[Math. 28]}$$

As an example, the control unit 165 calculates the received quality by performing division using received power indicated by the first received power information and received power indicated by the second received power information. Specifically, for example, the control unit 165 calculates the received quality as follows.

$$RSRQ(B(0) \text{ with } V) = \frac{RSRP(B(0) \text{ with } V)}{RSSI_{CONTROL}} \quad \text{[Math. 29]}$$

(Target Base Station)
(a) Target Base Station

As described above, the target base station is a base station serving as a target whose received quality will be calculated. For example, the processing unit 160 (for example, the control unit 165) selects the target base station from among the plurality of base stations that are positioned around the terminal device 100-3. As an example, the processing unit 160 selects a base station of a measurement target cell (for example, a serving cell and a neighbor cell) as the target base station. As a result, received quality in the selected base station is calculated.

It should be understood that not only one target base station but also two or more target base stations may be selected. As a result, received quality in each of the two or more target base stations may be calculated.

(b) Weight Set Used by Target Base Station

As described above, in the first RS transmission case, the received quality can be calculated for each weight set used by the target base station. For example, the processing unit 160 (for example, the control unit 165) selects a weight set from among a plurality of weight sets used by the target base station. As a result, received quality for the selected weight set is calculated.

It should be understood that not only one weight set but also two or more weight sets may be selected. As a result, received quality for each of the two or more weight sets may be calculated.

<7.3. Process Flow>

Next, an example of a process according to the third embodiment will be described with reference to FIG. 17. FIG. 17 is a flowchart illustrating an example of a schematic flow of a process according to the third embodiment. The process is performed by the terminal device 100-3.

The information acquiring unit 163 acquires first received power information indicating received power of a reference signal for measurement transmitted by a target base station using a weight set for beamforming in the terminal device 100-3 (S341).

In addition, the information acquiring unit 163 acquires second received power information indicating received power of a signal transmitted within a symbol in which physical downlink control channels (PDCCHs) are arranged (that is, a control region symbol) in the terminal device 100-3 (S343).

Then, the control unit 165 calculates received quality of the reference signal transmitted by the target base station in the terminal device 100-3 based on the first received power information and the second received power information (S345). Then, the process ends.

The third embodiment has been described above. According to the third embodiment, for example, it is possible to select a cell that is more preferable for the terminal device 100-3 in an environment in which beamforming is performed. More specifically, for example, received quality in the target base station is calculated based on received power in the target base station (that is, received power indicated by first received power information) and received power of a stable desired signal, interference and noise (S+I+N) (that is, received power indicated by second received power information) in the environment in which beamforming is performed. Therefore, the received quality is not significantly changed according to a weight set used by a neighbor base station of the target base station. Then, the received quality is used when a handover or a cell selection/reselection is performed. As a result, a cell that is more preferable for the terminal device 100-3 may be selected.

In addition, in the third embodiment, since the terminal device 100-3 calculates the received quality, information for calculating the received quality may not be transmitted to the base station 200-3. Therefore, radio resources may be saved.

8. FOURTH EMBODIMENT

Figure 18:
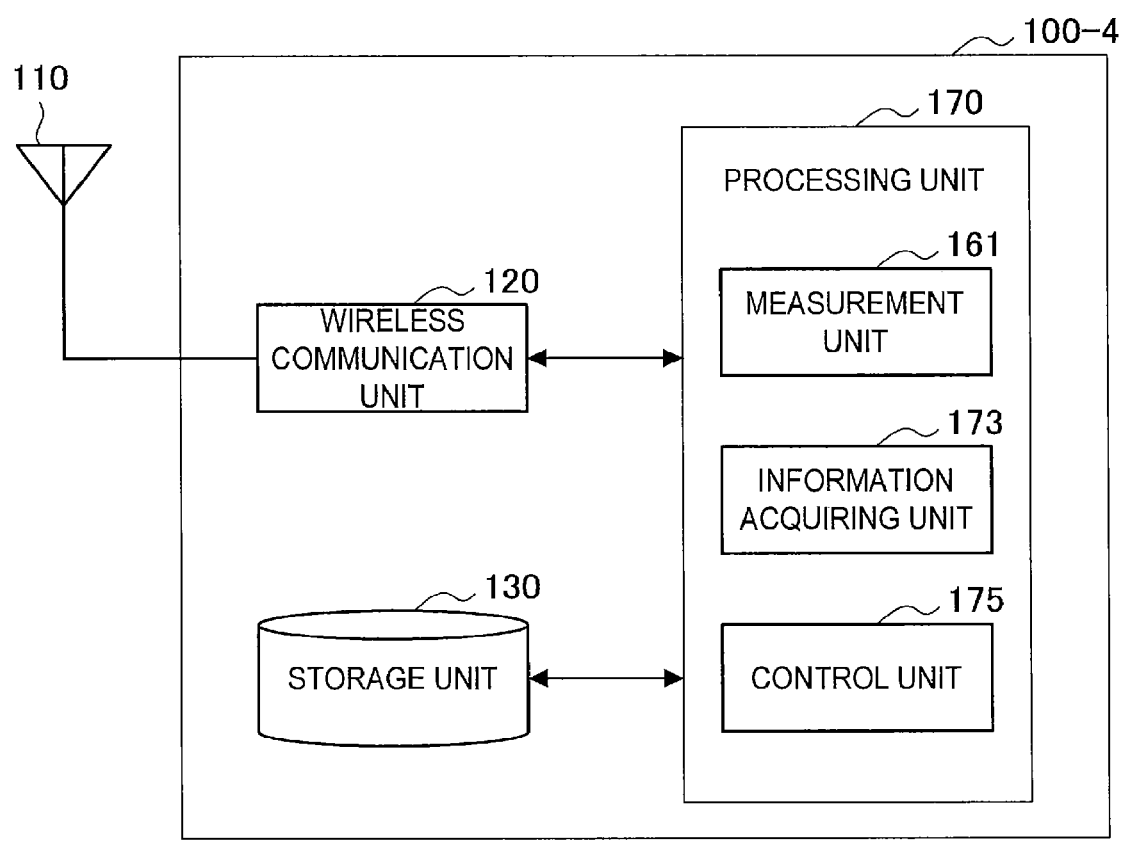
FIG. 18 is a block diagram illustrating an example of a configuration of a terminal device according to a fourth embodiment.
Figure 19:
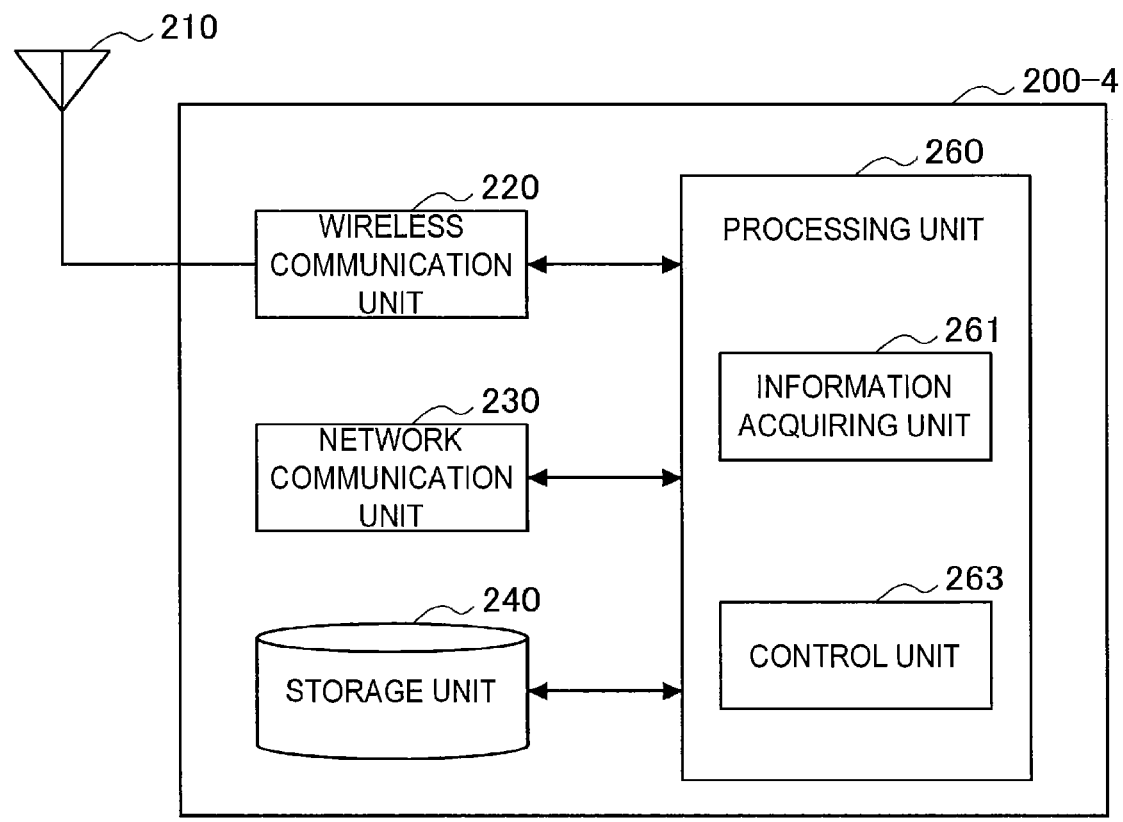
FIG. 19 is a block diagram illustrating an example of a configuration of a base station according to the fourth embodiment.
Figure 20:
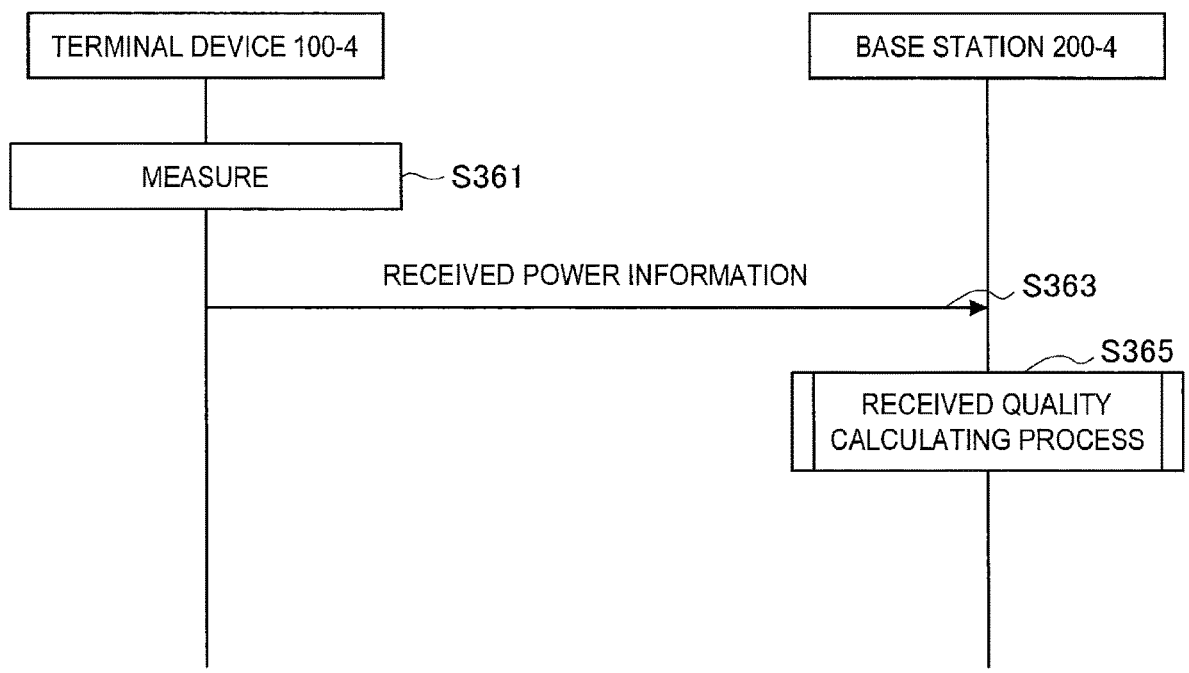
FIG. 20 is a sequence diagram illustrating an example of a schematic flow of a process according to the fourth embodiment.

Next, a fourth embodiment of the present disclosure will be described with reference to FIG. 18 to FIG. 20.

While the terminal device 100-3 calculates received quality in the third embodiment, a base station 200-4 calculates received quality in the fourth embodiment.

<8.1. Configuration of Terminal Device>

First, an example of a configuration of the terminal device 100-4 according to the fourth embodiment will be described with reference to FIG. 18. FIG. 18 is a block diagram illustrating an example of a configuration of the terminal device 100-4 according to the fourth embodiment. As illustrated in FIG. 18, the terminal device 100-4 includes an antenna unit 110, a wireless communication unit 120, a storage unit 130 and a processing unit 170.

There is no difference in descriptions of the antenna unit 110, the wireless communication unit 120, and the storage unit 130 between the first embodiment and the fourth embodiment except for different reference numerals. Therefore, redundant descriptions will be omitted here, and only the processing unit 170 will be described.

(Processing Unit 170)

The processing unit 170 provides various functions of the terminal device 100-4. The processing unit 170 includes a measurement unit 161, an information acquiring unit 173 and a control unit 175. The processing unit 170 may further include a component other than these components. That is, the processing unit 170 may also perform an operation other than operations of these components.

There is no difference in descriptions of the measurement unit 161 between the third embodiment and the fourth embodiment except for different reference numerals. Therefore, redundant descriptions will be omitted here, and only the information acquiring unit 173 and the control unit 175 will be described.

(Information Acquiring Unit 173)

(a) Received Power Information Indicating Received Power of Reference Signal for Measurement The information acquiring unit 173 acquires received power information indicating received power of a reference signal for measurement transmitted by a base station using a weight set for beamforming in the terminal device 100-4.

For example, the received power information is output by the measurement unit 161. The information acquiring unit 173 acquires the received power information.

For example, the received power information is a candidate for first received power information used for calculating received quality.

(b) Additional Received Power Information Indicating Received Power of Signal Transmitted within Control Region Symbol.

The information acquiring unit 173 acquires additional received power information indicating received power of a signal transmitted within a symbol in which physical downlink control channels (PDCCHs) are arranged (that is, a control region symbol) in the terminal device 100-4.

For example, the additional received power information is output by the measurement unit 161. The information acquiring unit 173 acquires the received power information.

For example, the additional received power information is second received power information that is used to calculate received quality.

(Control Unit 175)

The control unit 175 provides the received power information to the base station 200-4. In addition, the control unit 175 further provides the additional received power information to the base station 200-4.

Specifically, for example, the control unit 175 provides the received power information and the additional received power information to the base station 200-4 periodically and/or according to a generation of a predetermined event. The control unit 175 provides the received power information and the additional received power information to the base station 200-4 through the antenna unit 110 and the wireless communication unit 120.

<8.2. Configuration of Base Station>

Next, an example of a configuration of the base station 200-4 according to the fourth embodiment will be described with reference to FIG. 19. FIG. 19 is a block diagram illustrating an example of a configuration of the base station 200-4 according to the fourth embodiment. As illustrated in FIG. 19, the base station 200-4 includes the antenna unit 210, the wireless communication unit 220, the network communication unit 230, the storage unit 240 and a processing unit 260.

There is no difference in descriptions of the antenna unit 210, the wireless communication unit 220, the network communication unit 230 and the storage unit 240 between the second embodiment and the fourth embodiment except for different reference numerals. Therefore, redundant descriptions will be omitted here, and only the processing unit 260 will be described.

(Information Acquiring Unit 261)

(a) First Received Power Information

The information acquiring unit 261 acquires first received power information indicating received power of a reference signal for measurement transmitted by a target base station using a weight set for beamforming in the terminal device 100-4.

For example, the terminal device 100-4 provides received power information indicating received power (that is, a candidate for the first received power information) of a reference signal for measurement transmitted by a base station using a weight set for beamforming in the terminal device 100-4 to the base station 200-4. Then, the received power information is stored in the storage unit 240. The information acquiring unit 261 acquires the first received power information (that is, the received power information for the target base station) from the storage unit 240 at any timing thereafter.

The target base station is a base station serving as a target whose received quality will be calculated. That is, the target base station is changed according to a base station whose received quality will be calculated. As an example, the processing unit 260 (for example, a control unit 263) selects the target base station from among a plurality of base stations that are positioned around the terminal device 100-4.

(b) Second Received Power Information

The information acquiring unit 261 acquires second received power information indicating received power of a signal transmitted within a symbol in which physical downlink control channels are arranged (that is, a control region symbol) in the terminal device 100-4.

For example, the terminal device 100-4 provides the second received power information (that is, the additional received power information) to the base station 200-4. Then, the second received power information is stored in the storage unit 240. The information acquiring unit 261 acquires the second received power information from the storage unit 240 at any timing thereafter.

(Control Unit 263)

(a) Calculation of Received Quality

The control unit 263 calculates received quality of the reference signal transmitted by the target base station in the terminal device 100-4 based on the first received power information and the second received power information.

(b) Handover

For example, the control unit 263 decides to handover the terminal device 100-4 based on received quality information indicating the calculated received quality.

Specifically, for example, the control unit 263 selects a base station associated with favorable received quality as a handover target base station of the terminal device 100-4. Then, the control unit 263 decides to handover the terminal device 100-4 to the selected base station.

(Others)

The base station 200-4 transmits, for example, a reference signal for measurement using a weight set for beamforming. More specifically, for example, the base station 200-4 (for example, the processing unit 260) maps a reference signal for measurement to radio resources and multiplies the reference signal by a weight set.

<8.3. Method of Calculating Received Quality>

There is no difference in descriptions of the method of calculating received quality between the third embodiment and the fourth embodiment except a difference in the main entities (that is, the terminal device 100-3 is the main entity in the third embodiment and the base station 200-4 is the main entity in the fourth embodiment). Therefore, redundant descriptions will be omitted here. In the fourth embodiment, "information acquiring unit 163" is replaced by "information acquiring unit 261," "control unit 165" is replaced by "control unit 263," and "processing unit 160" is replaced by "processing unit 260."

<8.4. Process Flow>

Next, an example of a process according to the fourth embodiment will be described with reference to FIG. 20. FIG. 20 is a sequence diagram illustrating an example of a schematic flow of a process according to the fourth embodiment.

The terminal device 100-4 (the measurement unit 161) measures received power of a reference signal for measurement transmitted by a base station using a weight set for beamforming in the terminal device 100-4 (S361). In addition, the terminal device 100-4 (the measurement unit 161) measures received power of a signal transmitted within a symbol in which physical downlink control channels (PD-CCHs) are arranged (that is, a control region symbol) in the terminal device 100-4 (S361).

Then, the terminal device 100-4 (the control unit 175) provides received power information indicating the received power of the reference signal in the terminal device 100-4 to the base station 200-4 (S363). In addition, the terminal device 100-4 (the control unit 175) further provides additional received power information indicating the received power of a signal transmitted within the control region symbol in the terminal device 100-4 to the base station 200-4 (S363).

Then, the base station 200-4 performs a received quality calculating process (S365). That is, the base station 200-4 (the information acquiring unit 261) acquires first received power information indicating received power of a reference signal for measurement transmitted by a target base station using a weight set for beamforming in the terminal device 100-4. In addition, the base station 200-4 (the information acquiring unit 261) acquires second received power information indicating received power of a signal transmitted within a symbol in which physical downlink control channels are arranged (that is, a control region symbol) in the terminal device 100-4. Then, the base station 200-4 (the control unit 263) calculates received quality of the reference signal transmitted by the target base station in the terminal device 100-4 based on the first received power information and the second received power information. Then, the process ends.

An example of a schematic flow of the received quality calculating process is the same as the example of a schematic flow of a process according to the third embodiment described with reference to FIG. 17 except for, for example, a difference in the main entities. In the fourth embodiment, "information acquiring unit 163" is replaced by "information acquiring unit 261" and "control unit 165" is replaced by "control unit 263."

The fourth embodiment has been described above. Similarly to the third embodiment, according to the fourth embodiment, it is possible to select a cell that is more preferable for the terminal device 100-4 in an environment in which beamforming is performed.

In addition, according to the fourth embodiment, the terminal device 100-4 provides received power information to the base station 200-4, and the base station 200-4 calculates the received quality based on the received power information. Therefore, for example, the base station 200-4 can freely calculate various types of received quality by combining received quality information.

9. APPLICATION EXAMPLES

The technology according to the present disclosure is applicable to a variety of products. The base station 200 may also be implemented, for example, as any type of evolved Node B (eNB) such as macro eNBs and small eNBs. Small eNBs may cover smaller cells than the macrocells of pico eNBs, micro eNBs, or home (femt) eNBs. Instead, the base station 200 may be implemented as another type of base station such as Nodes B or base transceiver stations (BTSs). The base station 200 may include the main apparatus (which is also referred to as base station apparatus) that controls wireless communication and one or more remote radio heads (RRHs) that are disposed at different locations from that of the main apparatus. Further, various types of terminals as will be discussed later may temporarily or semi-persistently execute the base station function to operate as the base station 200. Further, at least part of components of the base station 200 may be implemented in a base station device or a module for the base station device.

The terminal device 100 may be implemented as a mobile terminal such as smartphones, tablet personal computers (PCs), notebook PCs, portable game terminals, portable/dongle mobile routers, and digital cameras, or an in-vehicle terminal such as car navigation apparatuses. The terminal device 100 may also be implemented as a terminal (which is also referred to as machine type communication (MTC) terminal) that performs machine to machine (M2M) communication. Furthermore, at least part of components of the terminal device 100 may be implemented as a module (e.g. integrated circuit module constituted with a single die) that is mounted on these terminals.

<9.1. Application Examples for Base Station>
(First Application Example)

Figure 21:
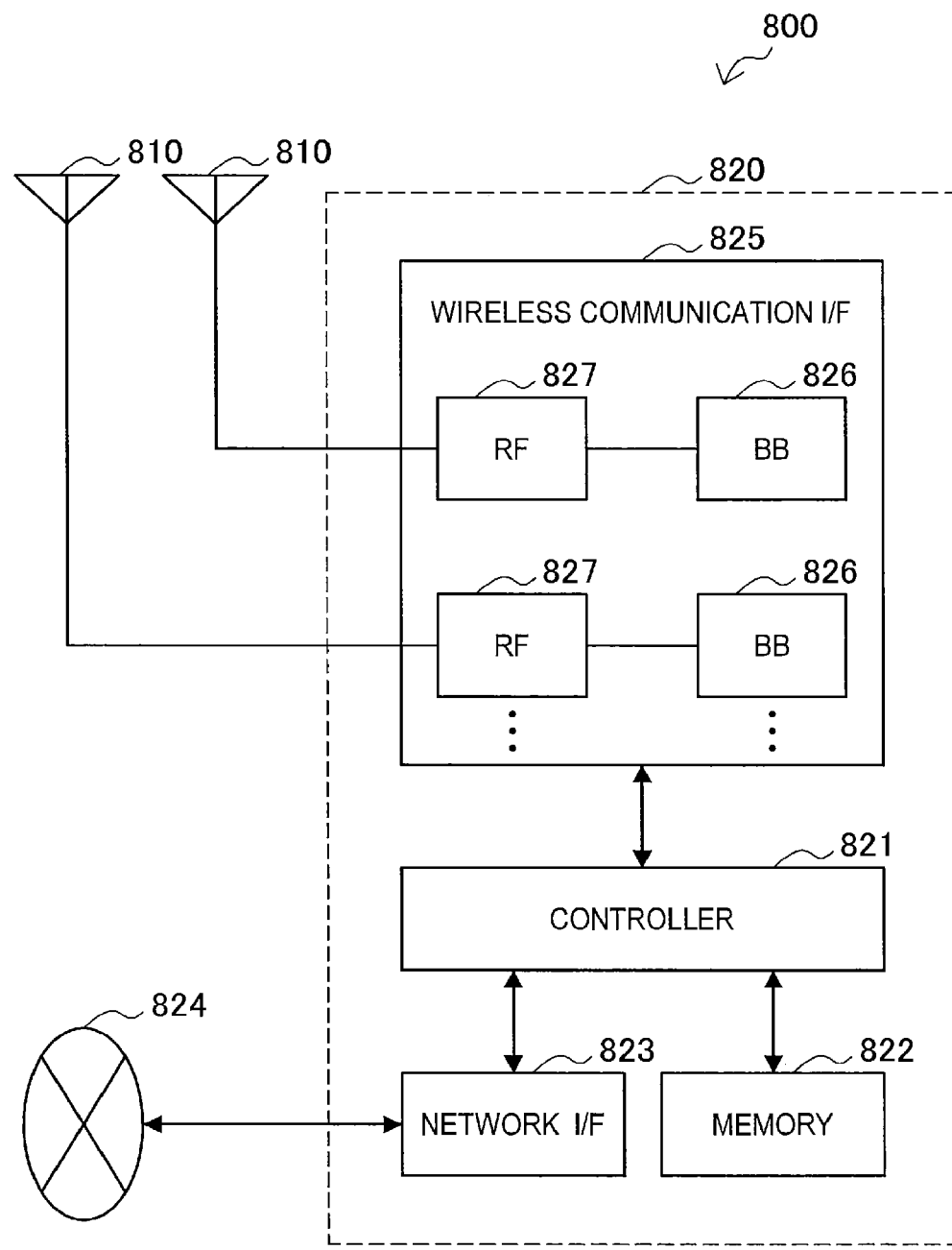
FIG. 21 is a block diagram illustrating a first example of a schematic configuration of an eNB.

FIG. 21 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g. a plurality of antenna elements constituting a MIMO antenna) and is used for the base station apparatus 820 to transmit and receive a wireless signal. The eNB 800 may include the plurality of the antennas 810 as illustrated in FIG. 21, and the plurality of antennas 810 may, for example, correspond to a plurality of frequency bands used by the eNB 800. It should be noted that while FIG. 21 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. The controller 821 may also have a logical function of performing control such as radio resource control, radio bearer control, mobility management, admission control, and scheduling. The control may be performed in cooperation with a surrounding eNB or a core network. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the controller 821 may be mutually connected to the eNB 800 and a core network node or another eNB through a logical interface (e.g. S1 interface or X2 interface). The network interface 823 may be a wired communication interface or a wireless communication interface for wireless backhaul. When the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826 and an RF circuit 827. The BB processor 826 may, for example, perform encoding/decoding, modulation/demodulation, multiplexing/demultiplexing, and the like, and performs a variety of signal processing on each layer (e.g. L1, medium access control (MAC), radio link control (RLC), and packet data convergence protocol (PDCP)). The BB processor 826 may have part or all of the logical functions as discussed above instead of the controller 821. The BB processor 826 may be a module including a memory having a communication control program stored therein, a processor to execute the program, and a related circuit, and the function of the BB processor 826 may be changeable by updating the program. The module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 21, and the plurality of BB processors 826 may, for example, correspond to a plurality of frequency bands used by the eNB 800. The wireless communication interface 825 may also include a plurality of the RF circuits 827, as illustrated in FIG. 21, and the plurality of RF circuits 827 may, for example, correspond to a plurality of antenna elements. FIG. 21 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 21, the information acquiring unit 251 and the control unit 253 described above with reference to FIG. 14 may be mounted in the wireless communication interface 825. Alternatively, at least some of the components may be mounted in the controller 821. As an example, the eNB 800 may be equipped with a module including some or all components of the wireless communication interface 825 (for example, the BB processor 826) and/or the controller 821, and the information acquiring unit 251 and the control unit 253 above may be mounted in the module. In this case, the module may store a program causing the processor to function as the information acquiring unit 251 and the control unit 253 above (that is, a program causing the processor to perform the operation of the information acquiring unit 251 and the control unit 253 above) and execute the program. As another example, the program causing the processor to function as the information acquiring unit 251 and the control unit 253 above may be installed in the eNB 800, and the wireless communication interface 825 (for example, the BB processor 826) and/or the controller 821 may execute the program. As described above, the eNB 800, the base station apparatus 820, or the module may be provided as an apparatus including the information acquiring unit 251 and the control unit 253 above, and the program causing the processor to function as the information acquiring unit 251 and the control unit 253 above may be provided. A readable recording medium in which the program is recorded may be provided. For these points, the information acquiring unit 261 and the control unit 263 described above with reference to FIG. 19 are the same as the information acquiring unit 251 and the control unit 253.

In the eNB 800 illustrated in FIG. 21, the wireless communication unit 220 described above with reference to FIG. 14 may be mounted in the wireless communication interface 825 (for example, the RF circuit 827). The antenna unit 210 may be mounted in the antenna 810. The network communication unit 230 may be mounted in the controller 821 and/or the network interface 823.

(Second Application Example)

Figure 22:
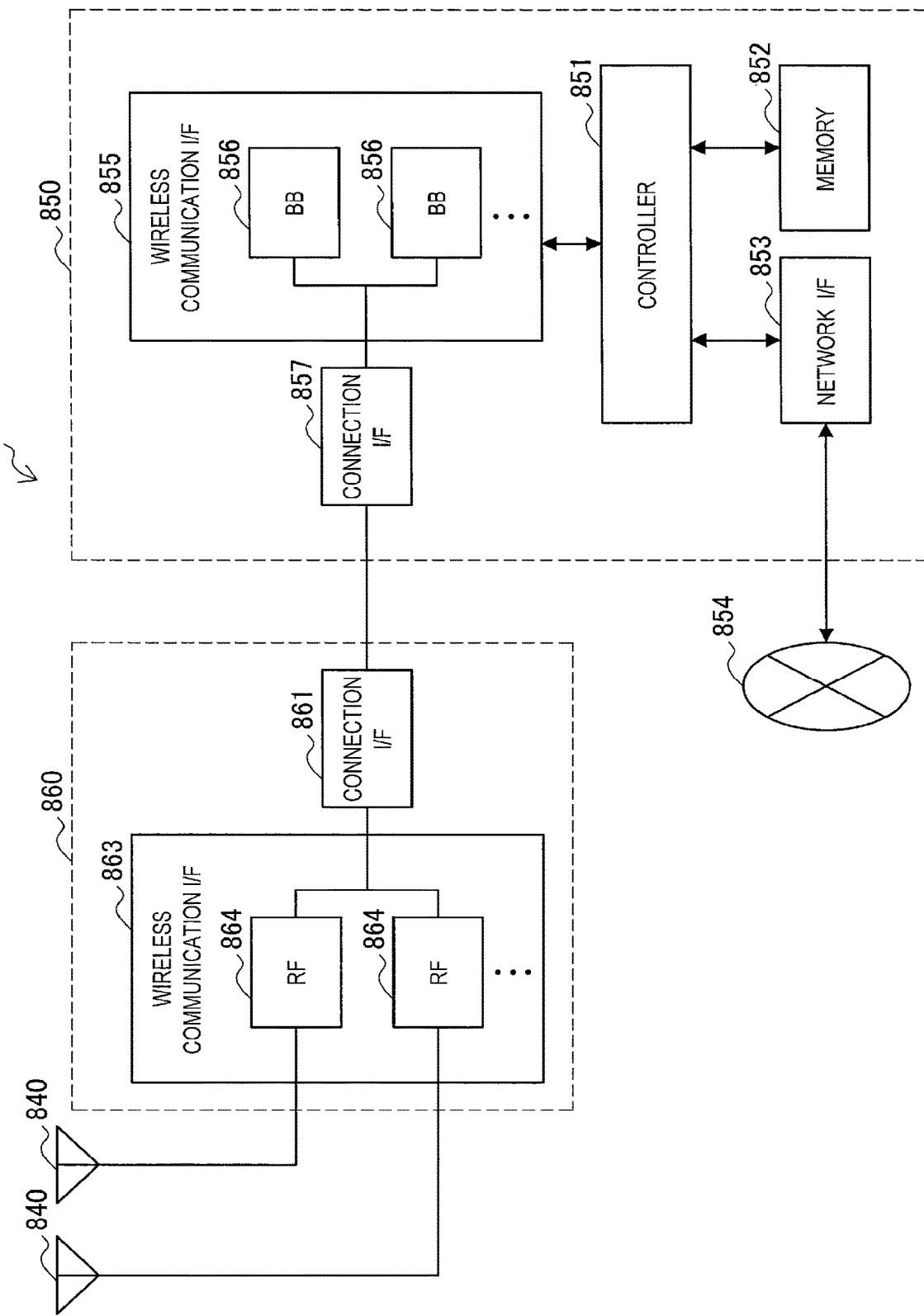
FIG. 22 is a block diagram illustrating a second example of the schematic configuration of the eNB.

FIG. 22 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. The base station apparatus 850 and the RRH 860 may be connected to each other by a high speed line such as optical fiber cables.

Each of the antennas 840 includes a single or a plurality of antenna elements (e.g. antenna elements constituting a AMMO antenna), and is used for the RRH 860 to transmit and receive a wireless signal. The eNB 830 may include a plurality of the antennas 840 as illustrated in FIG. 22, and the plurality of antennas 840 may, for example, correspond to a plurality of frequency bands used by the eNB 830. FIG. 22 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 21.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856. The BB processor 856 is the same as the BB processor 826 described with reference to FIG. 21 except that the BB processor 856 is connected to an RF circuit 864 of the RRH 860 via the connection interface 857. The wireless communication interface 855 may include a plurality of the BB processors 856, as illustrated in FIG. 22, and the plurality of BB processors 856 may, for example, correspond to a plurality of frequency bands used by the eNB 830 respectively. FIG. 22 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864. The RF circuit 864 may include a mixer, a filter, an amplifier and the like, and transmits and receives a wireless signal via the antenna 840. The wireless communication interface 863 may include a plurality of the RF circuits 864 as illustrated in FIG. 22, and the plurality of RF circuits 864 may, for example, correspond to a plurality of antenna elements. FIG. 22 illustrates an example in which the wireless communication interface 863 includes the plurality of RF circuits 864, but the wireless communication interface 863 may include the single RF circuit 864.

In the eNB 830 illustrated in FIG. 22, the information acquiring unit 251 and the control unit 253 described above with reference to FIG. 14 may be mounted in the wireless communication interface 855 and/or the wireless communication interface 863. Alternatively, at least some of the components may be mounted in the controller 851. As an example, the eNB 830 may be equipped with a module including some or all components of the wireless communication interface 855 (for example, the BB processor 856) and/or the controller 851, and the information acquiring unit 251 and the control unit 253 above may be mounted in the module. In this case, the module may store a program causing the processor to function as the information acquiring unit 251 and the control unit 253 above (that is, a program causing the processor to perform the operation of the information acquiring unit 251 and the control unit 253 above) and execute the program. As another example, the program causing the processor to function as the information acquiring unit 251 and the control unit 253 above may be installed in the eNB 830, and the wireless communication interface 855 (for example, the BB processor 856) and/or the controller 851 may execute the program. As described above, the eNB 830, the base station apparatus 850, or the module may be provided as an apparatus including the information acquiring unit 251 and the control unit 253 above, and the program causing the processor to function as the information acquiring unit 251 and the control unit 253 above may be provided. A readable recording medium in which the program is recorded may be provided. For these points, the information acquiring unit 261 and the control unit 263 described above with reference to FIG. 19 are the same as the information acquiring unit 251 and the control unit 253.

In the eNB 830 illustrated in FIG. 22, the wireless communication unit 220 described above with reference to FIG. 14 may be mounted in the wireless communication interface 863 (for example, the RF circuit 864). The antenna unit 210 may be mounted in the antenna 840. The network communication unit 230 may be mounted in the controller 851 and/or the network interface 853.

<9.2. Application Examples for Terminal Device>
(First Application Example)

Figure 23:
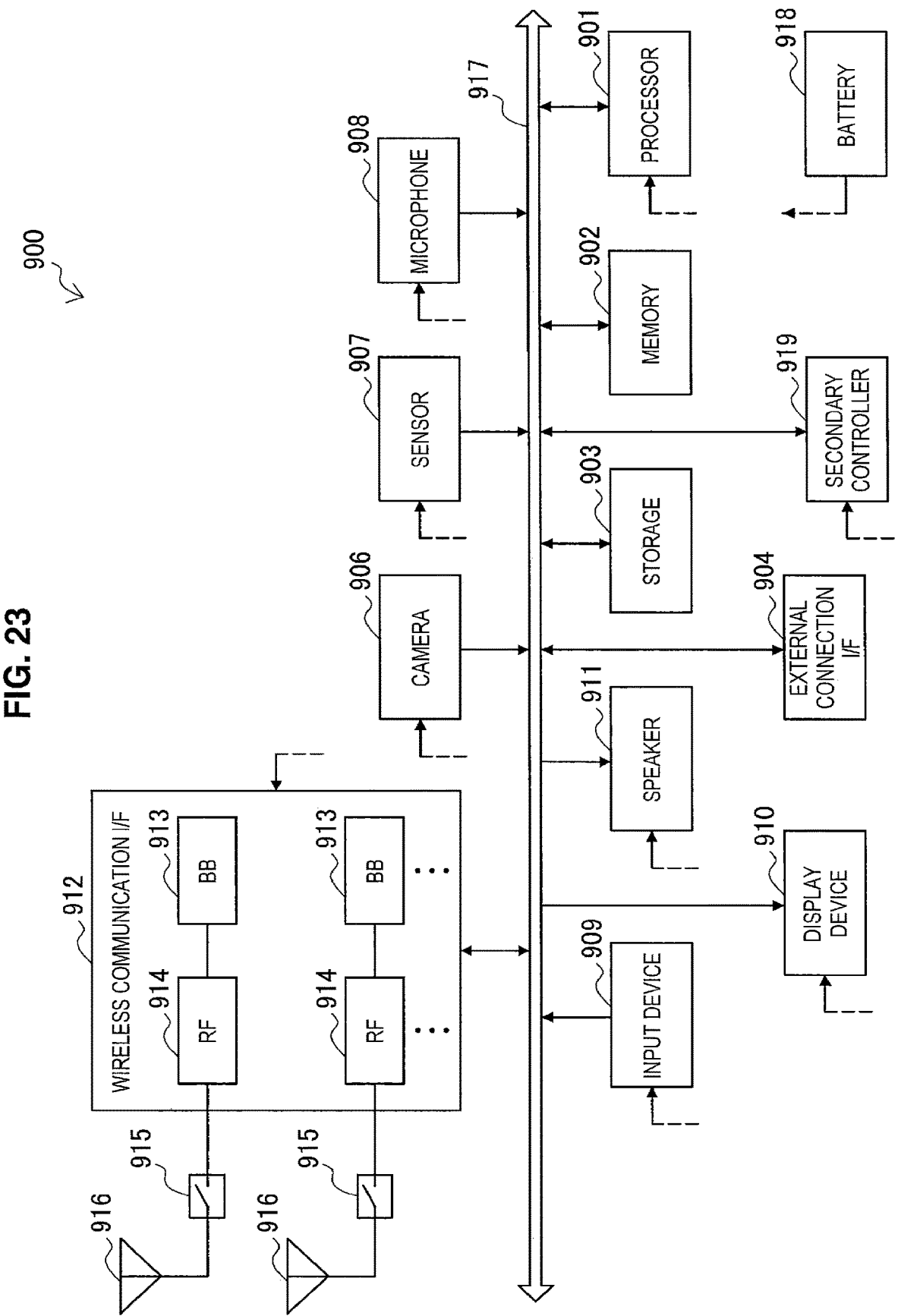
FIG. 23 is a block diagram illustrating an example of a schematic configuration of a smartphone.

FIG. 23 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and a secondary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, and an acceleration sensor. The microphone 908 converts a sound that is input into the smartphone 900 to an audio signal. The input device 909 includes, for example, a touch sensor which detects that a screen of the display device 910 is touched, a key pad, a keyboard, a button, or a switch, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 23. FIG. 23 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 23. FIG. 23 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the secondary controller 919 to each other. The battery 918 supplies electric power to each block of the smartphone 900 illustrated in FIG. 23 via a feeder line that is partially illustrated in the figure as a dashed line. The secondary controller 919, for example, operates a minimally necessary function of the smartphone 900 in a sleep mode.

In the smartphone 900 illustrated in FIG. 23, one or more components (the measurement unit 141, the information acquiring unit 143 and/or the control unit 145) included in the processing unit 140 described above with reference to FIG. 11 may be mounted in the wireless communication interface 912. Alternatively, at least some of the components may be mounted in the processor 901 or the secondary controller 919. As an example, the smartphone 900 may be equipped with a module including some or all components of the wireless communication interface 912 (for example, the BB processor 913), the processor 901, and/or the secondary controller 919, and the one or more components above may be mounted in the module. In this case, the module may store a program causing the processor to function as the one or more components above (that is, a program causing the processor to perform the operation of the one or more components above) and execute the program. As another example, the program causing the processor to function as the one or more components above may be installed in the smartphone 900, and the wireless communication interface 912 (for example, the BB processor 913), the processor 901, and/or the secondary controller 919 may execute the program. As described above, the smartphone 900 or the module may be provided as an apparatus including the one or more components above, and the program causing the processor to function as the one or more components above may be provided. A readable recording medium in which the program is recorded may be provided. For these points, one or more components (the measurement unit 141, the information acquiring unit 153 and/or the control unit 155) included in the processing unit 150 described with reference to FIG. 13, one or more components (the measurement unit 161, the information acquiring unit 163 and/or the control unit 165) included in the processing unit 160 described with reference to FIG. 16, and one or more components (the measurement unit 161, the information acquiring unit 173 and/or the control unit 175) included in the processing unit 170 described with reference to FIG. 18 are similar to the one or more components included in the processing unit 140.

In the smartphone 900 illustrated in FIG. 23, for example, the wireless communication unit 120 described above with reference to FIG. 11 may be mounted in the wireless communication interface 912 (for example, the RF circuit 914). The antenna unit 110 may be mounted in the antenna 916.

(Second Application Example)

FIG. 24 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g. latitude, longitude, and altitude) of the car navigation apparatus 920. The sensor 925 may include a sensor group including, for example, a gyro sensor, a geomagnetic sensor, and an air pressure sensor. The data interface 926 is, for example, connected to an in-vehicle network 941 via a terminal that is not illustrated, and acquires data such as vehicle speed data generated on the vehicle side.

The content player 927 reproduces content stored in a storage medium (e.g. CD or DVD) inserted into the storage medium interface 928. The input device 929 includes, for example, a touch sensor which detects that a screen of the display device 930 is touched, a button, or a switch, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 24. FIG. 24 illustrates an example in which the wireless communication interface 933 includes a plurality of BB processors 934 and a plurality of RF circuits 935, but the wireless communication interface 933 may be a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a AMMO antenna) and is used for transmission and reception of the wireless signal by the wireless communication interface 933. The car navigation apparatus 920 includes a plurality of antennas 937 as illustrated in FIG. 24. FIG. 24 illustrates an example in which the car navigation apparatus 920 includes a plurality of antennas 937, but the car navigation apparatus 920 may include a single antenna 937.

Further, the smartphone 920 may include the antenna 937 for each wireless communication system. In this case, the antenna switch 936 may be omitted from a configuration of the car navigation apparatus 920.

The battery 950 supplies electric power to each block of the car navigation apparatus 930 illustrated in FIG. 21 via a feeder line that is partially illustrated in the figure as a dashed line. The battery 950 accumulates the electric power supplied from the vehicle.

In the car navigation apparatus 920 illustrated in FIG. 24, one or more components (the measurement unit 141, the information acquiring unit 143 and/or the control unit 145) included in the processing unit 140 described above with reference to FIG. 11 may be mounted in the wireless communication interface 933. Alternatively, at least some of the components may be mounted in the processor 921. As an example, the car navigation apparatus 920 may be equipped with a module including some or all components of the wireless communication interface 933 (for example, the BB processor 934), the processor 901, and/or the processor 921, and the one or more components above may be mounted in the module. In this case, the module may store a program causing the processor to function as the one or more components above (that is, a program causing the processor to perform the operation of the one or more components above) and execute the program. As another example, the program causing the processor to function as the one or more components above may be installed in the car navigation apparatus 920, and the wireless communication interface 933 (for example, the BB processor 934), and/or the processor 921 may execute the program. As described above, the car navigation apparatus 920 or the module may be provided as an apparatus including the one or more components above, and the program causing the processor to function as the one or more components above may be provided. A readable recording medium in which the program is recorded may be provided. For these points, one or more components (the measurement unit 141, the information acquiring unit 153 and/or the control unit 155) included in the processing unit 150 described with reference to FIG. 13, one or more components (the measurement unit 161, the information acquiring unit 163 and/or the control unit 165) included in the processing unit 160 described with reference to FIG. 16, and one or more components (the measurement unit 161, the information acquiring unit 173 and/or the control unit 175) included in the processing unit 170 described with reference to FIG. 18 are similar to the one or more components included in the processing unit 140.

In the car navigation apparatus 920 illustrated in FIG. 24, for example, the wireless communication unit 120 described above with reference to FIG. 11 may be mounted in the wireless communication interface 933 (for example, the RF circuit 935). The antenna unit 110 may be mounted in the antenna 937.

Further, the technique according to the present disclosure may be implemented as an in-vehicle system (or a vehicle) 940 including one or more blocks of the above-described car navigation apparatus 920, an in-vehicle network 941 and a vehicle side module 942. That is, the in-vehicle system (or the vehicle) 940 may be provided as an apparatus including one or more components included in the processing unit 140 (or the processing unit 150, the processing unit 160, or the processing unit 170). The vehicle side module 942 generates vehicle side data such as vehicle speed, engine speed and failure information and outputs the generated data to the in-vehicle network 961.

10. CONCLUSION

The device and the processes according to the embodiments of the present disclosure have been described so far with reference to FIG. 3 to FIG. 24.

First Embodiment and Second Embodiment

According to the first embodiment and the second embodiment of the present disclosure, there is provided a device that includes an information acquiring unit configured to acquire first received power information indicating received power of a reference signal for measurement transmitted by a target base station using a weight set for beamforming in the terminal device 100 and second received power information indicating received power of a reference signal for measurement transmitted by another base station using a weight set for beamforming in the terminal device 100 and a control unit configured to calculate received quality of the reference signal transmitted by the target base station in the terminal device 100 based on the first received power information and the second received power information.

Accordingly, for example, it is possible to select a cell that is more preferable for the terminal device 100 in an environment in which beamforming is performed.

More specifically, for example, received quality in the target base station is calculated based on received power (that is, received power indicated by first received power information) in the target base station and interference (that is, received power indicated by second received power information) in an environment in which beamforming is performed. Therefore, the received quality may be close to received quality when the terminal device 100 performs wireless communication in the environment in which beamforming is performed. Then, the received quality is used when a handover or a cell selection/reselection is performed. As a result, a cell that is more preferable for the terminal device 100 may be selected.

In the first embodiment, the device is the terminal device 100 or a module for the terminal device 100. In addition, in the second embodiment, the device is the base station 200, a base station device for the base station 200, or a module for the base station device.

Third Embodiment and Fourth Embodiment

According to the third embodiment and the fourth embodiment of the present disclosure, there is provided a device that includes an information acquiring unit configured to acquire first received power information indicating received power of a reference signal for measurement transmitted by a target base station using a weight set for beamforming in the terminal device 100 and second received power information indicating received power of a signal transmitted within a symbol in which physical downlink control channels are arranged in the terminal device 100 and a control unit configured to calculate received quality of the reference signal transmitted by the target base station in the terminal device 100 using the first received power information and the second received power information.

Accordingly, for example, it is possible to select a cell that is more preferable for the terminal device 100 in an environment in which beamforming is performed.

More specifically, for example, received quality in the target base station is calculated based on received power in the target base station (that is, received power indicated by first received power information) and received power of a stable desired signal, interference and noise (S+T+N) (that is, received power indicated by second received power information) in an environment in which beamforming is performed. Therefore, the received quality is not significantly changed according to a weight set used by a neighbor base station of the target base station. Then, the received quality is used when a handover or a cell selection/reselection is performed. As a result, a cell that is more preferable for the terminal device 100 may be selected.

In the third embodiment, the device is the terminal device 100 or a module for the terminal device 100. In addition, in the fourth embodiment, the device is the base station 200, a base station device for the base station 200, or a module for the base station device.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, while an example in which a communication system supports, for example, LTE, LTE-Advanced or a communication standard equivalent thereto has been described, the present disclosure is not limited thereto. For example, the communication system may be a system that supports another communication standard.

Further, it is not always necessary to execute the processing steps in the processing in the present specification in chronological order in order described in the flowcharts or the sequence diagrams. For example, the processing steps in the above-described processing may be executed in order different from the order described in the flowcharts or the sequence diagrams or may be executed in parallel.

Further, it is also possible to create a computer program for making a processor (such as, for example, a CPU and a DSP) provided at apparatuses (such as, for example, the terminal device or the module for the terminal device, or the base station, the base station device for the base station or the module of the base station device) in the present specification function as components (for example, an information acquiring unit and the control unit) of the above-described apparatuses (in other words, a computer program for making the processor execute operation of the components of the above-described apparatuses). Further, it is also possible to provide a recording medium having the above-described computer program recorded therein. Further, it is also possible to provide an apparatus (such as, for example, a finished product and a module (such as parts, processing circuits and chips) for the finished product) including a memory having the above-described computer program stored therein and one or more processors which can execute the above-described computer program. Further, a method including the operation of the components (for example, an information acquiring unit and the control unit) of the above-described apparatuses is included in the technique according to the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A device including:

an acquiring unit configured to acquire first received power information indicating received power of a reference signal for measurement transmitted by a target base station using a weight set for beamforming in a terminal device and second received power information indicating received power of a reference signal for measurement transmitted by another base station using a weight set for beamforming in the terminal device; and a control unit configured to calculate received quality of the reference signal transmitted by the target base station in the terminal device based on the first received power information and the second received power information.

(2)

The device according to (1), wherein the acquiring unit acquires the second received power information for each of a plurality of other base stations, and the control unit calculates the received quality based on the first received power information and the second received power information for each of the plurality of other base stations.

(3)

The device according to (2), wherein the control unit calculates the received quality based on first received power indicated by the first received power information and second received power calculated based on the second received power information for each of the plurality of other base stations.

(4)

The device according to any one of (1) to (3), wherein the acquiring unit acquires the second received power information of each of two or more weight sets, and the control unit calculates the received quality based on the first received power information and the second received power information of each of the two or more weight sets.

(5)

The device according to (4), wherein the control unit calculates the received quality based on first received power indicated by the first received power information and second received power calculated based on the second received power information of each of the two or more weight sets.

(6)

The device according to any one of (1) to (5), wherein the acquiring unit acquires the second received power information of each of two or more weight sets for each of a plurality of other base stations, and the control unit calculates the received quality based on the first received power information and the second received power information of each of the two or more weight sets for each of the plurality of other base stations.

(7)

The device according to (6), wherein the control unit calculates the received quality based on first received power indicated by the first received power information and second received power calculated based on the second received power information of each of the two or more weight sets for each of the plurality of other base stations.

(8)

The device according to any one of (4) to (7), wherein the two or more weight sets are weight sets that provide higher received power in the terminal device than other weight sets.

(9)

The device according to any one of (4) to (7), wherein the two or more weight sets are designated weight sets.

(10)

The device according to (2) or (3), wherein the weight set used by the other base station is a weight set that provides higher received power in the terminal device than other weight sets.

(11)

The device according to (2) or (3), wherein the weight set used by the other base station is a designated weight set.

(12)

The device according to (3), (5), or (7), wherein the second received power is a sum of received powers indicated by the second received power information.

(13)

The device according to (3), (5), (7), or (12), wherein the control unit calculates the received quality by performing division using the first received power and the second received power.

(14)

A device including:

an acquiring unit configured to acquire first received power information indicating received power of a reference signal for measurement transmitted by a target base station using a weight set for beamforming in a terminal device and second received power information indicating received power of a signal transmitted within a symbol in which physical downlink control channels are arranged in the terminal device; and a control unit configured to calculate received quality of the reference signal transmitted by the target base station in the terminal device using the first received power information and the second received power information.

(15)

The device according to (14), wherein the control unit calculates the received quality by performing division using the received power indicated by the first received power information and the received power indicated by the second received power information.

(16)

A device including:

an acquiring unit configured to acquire received power information indicating received power of a reference signal for measurement transmitted by a base station using a weight set for beamforming in a terminal device; and a control unit configured to provide the received power information to a base station.

(17)

The device according to (16), wherein the acquiring unit acquires additional received power information indicating received power of a signal transmitted within a symbol in which physical downlink control channels are arranged in the terminal device; and the control unit further provides the additional received power information to the base station.

(18)

The device according to any one of (1) to (17), wherein the device is the terminal device or a module for the terminal device.

(19)

The device according to any one of (1) to (15), wherein the device is a base station, a base station device for the base station, or a module for the base station device.

(20)

The device according to any one of (1) to (19), wherein the beamforming is large-scale MIMO beamforming.

(21)

A method including:

acquiring first received power information indicating received power of a reference signal for measurement transmitted by a target base station using a weight set for beamforming in a terminal device and second received power information indicating received power of a reference signal for measurement transmitted by another base station using a weight set for beamforming in the terminal device; and calculating, by a processor, received quality of the reference signal transmitted by the target base station in the terminal device based on the first received power information and the second received power information.

(22)

A program for causing a processor to execute:

acquiring first received power information indicating received power of a reference signal for measurement transmitted by a target base station using a weight set for beamforming in a terminal device and second received power information indicating received power of a reference signal for measurement transmitted by another base station using a weight set for beamforming in the terminal device; and calculating received quality of the reference signal transmitted by the target base station in the terminal device based on the first received power information and the second received power information.

(23)

A readable recording medium having a program recorded thereon, the program causing a processor to execute:

acquiring first received power information indicating received power of a reference signal for measurement transmitted by a target base station using a weight set for beamforming in a terminal device and second received power information indicating received power of a reference signal for measurement transmitted by another base station using a weight set for beamforming in the terminal device; and calculating received quality of the reference signal transmitted by the target base station in the terminal device based on the first received power information and the second received power information.

(24)

A method including:

acquiring first received power information indicating received power of a reference signal for measurement transmitted by a target base station using a weight set for beamforming in a terminal device and second received power information indicating received power of a signal transmitted within a symbol in which physical downlink control channels are arranged in the terminal device; and calculating, by a processor, received quality of the reference signal transmitted by the target base station in the terminal device using the first received power information and the second received power information.

(25)

A program for causing a processor to execute:

acquiring first received power information indicating received power of a reference signal for measurement transmitted by a target base station using a weight set for beamforming in a terminal device and second received power information indicating received power of a signal transmitted within a symbol in which physical downlink control channels are arranged in the terminal device; and calculating received quality of the reference signal transmitted by the target base station in the terminal device using the first received power information and the second received power information.

(26)

A readable recording medium having a program recorded thereon, the program causing a processor to execute:

acquiring first received power information indicating received power of a reference signal for measurement transmitted by a target base station using a weight set for beamforming in a terminal device and second received power information indicating received power of a signal transmitted within a symbol in which physical downlink control channels are arranged in the terminal device; and calculating received quality of the reference signal transmitted by the target base station in the terminal device using the first received power information and the second received power information.

(27)

A method including:

acquiring received power information indicating received power of a reference signal for measurement transmitted by a base station using a weight set for beamforming in a terminal device; and providing, by a processor, the received power information to a base station.

(28)

A program for causing a processor to execute:

acquiring received power information indicating received power of a reference signal for measurement transmitted by a base station using a weight set for beamforming in a terminal device; and providing the received power information to a base station.

(29)

A readable recording medium having a program recorded thereon, the program for causing a processor to execute:

acquiring received power information indicating received power of a reference signal for measurement transmitted by a base station using a weight set for beamforming in a terminal device; and providing the received power information to a base station.

REFERENCE SIGNS LIST 1 communication system
30 subframe
31 control area
33 data area
100 terminal device
143, 153, 163, 173 information acquiring unit
145, 155, 165, 175 control unit
200 terminal device
251, 261 information acquiring unit
253, 263 control unit

The invention claimed is:

1. A device, comprising:

processing circuitry configured to:

acquire first received power information that indicates a first received power of a first reference signal, transmitted via first radio resources by a target base station, for a measurement by a terminal device using a first weight set for beamforming in the terminal device;

acquire second received power information that indicates a second received power of a second reference signal, transmitted via second radio resources by another base station, for another measurement by the terminal device using a second weight set for beamforming in the terminal device, the second weight set being different than the first weight set, and the second resources being different than the first resources; and calculate a received quality of the first reference signal by dividing the first received power by the second received power.

2. The device according to claim 1, wherein the processing circuitry acquires the second received power information for each of a plurality of other base stations, and the processing circuitry calculates the received quality based on the first received power and the second received power for each of the plurality of other base stations.

3. The device according to claim 2, wherein the processing circuitry calculates the received quality based on the first received power, which is calculated based on the first received power information, and the second received power for each of the plurality of other base stations, each of which is calculated based on the second received power information of each respective other base stations.

4. The device according to claim 3, wherein the second received power is a sum of received powers indicated by the second received power information.

5. The device according to claim 2, wherein a weight set, used by the other base station, provides higher received power in the terminal device than other weight sets.

6. The device according to claim 2, wherein a weight set, used by the other base station, is a designated weight set.

7. The device according to claim 1, wherein the processing circuitry acquires the second received power information of each of two or more weight sets, and the processing circuitry calculates the received quality based on the first received power information and the second received power information of each of the two or more weight sets.

8. The device according to claim 7, wherein the processing circuitry calculates the received quality based on the first received power, which is calculated based on the first received power information, and the second received power, which is calculated based on the second received power information of each of the two or more weight sets.

9. The device according to claim 7, wherein the two or more weight sets provide higher received power in the terminal device than other weight sets.

10. The device according to claim 7, wherein the two or more weight sets are designated weight sets.

11. The device according to claim 1, wherein
the processing circuitry acquires the second received power information of each of two or more weight sets for each of a plurality of other base stations, and
the processing circuitry calculates the received quality based on the first received power and the second received power of each of the two or more weight sets for each of the plurality of other base stations.

12. The device according to claim 11, wherein the processing circuitry calculates the received quality based on
the first received power, which is calculated based on the first received power information, and
the second received power, which is calculated based on the second received power information of each of the two or more weight sets for each of the plurality of other base stations.

13. The device according to claim 1, wherein the device is the terminal device or a module for the terminal device.

14. The device according to claim 1, wherein the device is a base station, a base station device for the base station, or a module for the base station device.

15. The device according to claim 1, wherein the beamforming is large-scale multiple input multiple output (MIMO) beamforming.

16. The device according to claim 1, wherein the received quality is a received quality in the target base station when the target base station uses the first weight set for the beamforming in the terminal device.

17. A device, comprising:
processing circuitry configured to:
acquire first received power information that indicates a first received power of a first reference signal, transmitted via first radio resources by a target base station, for a measurement by a terminal device using a first weight set for beamforming in the terminal device;
acquire second received power information that indicates a second received power of a signal transmitted within a symbol in which physical downlink control channels are arranged in the terminal device, the physical downlink control channels being different than the first resources; and
calculate a received quality of the first reference signal by dividing the first received power by the second received power.

18. The device according to claim 17, wherein the received quality is a received quality in the target base station when the target base station uses the weight set for the beamforming in the terminal device.

19. A device, comprising:
processing circuitry configured to:
acquire first received power information that indicates a first received power of a first reference signal, transmitted via first radio resources by a target base station, for a measurement by a terminal device using a first weight set for beamforming in the terminal device;
acquire second received power information that indicates a second received power of a signal transmitted within a symbol in which physical downlink control channels are arranged in the terminal device; and
provide the first received power information and the second received power information to a base station that calculates a received quality of the reference signal by dividing the first receiver power by the second received power.

20. The device according to claim 19, wherein the received quality is a received quality in the target base station when the target base station uses the weight set for the beamforming in the terminal device.

* * * * *